(12) United States Patent
Raanani et al.

(10) Patent No.: US 10,133,999 B2
(45) Date of Patent: Nov. 20, 2018

(54) ANALYZING CONVERSATIONS TO AUTOMATICALLY IDENTIFY DEALS AT RISK

(71) Applicant: AffectLayer, Inc., Tel Aviv-Yafo (IL)

(72) Inventors: Roy Raanani, Mill Valley, CA (US); Russell Levy, Raanana (IL); Dominik Facher, San Francisco, CA (US); Micha Yochanan Breakstone, Raanana (IL)

(73) Assignee: AffectLayer, Inc., Tel Aviv-Jaffa (IL)

( * ) Notice: Subject to any disclaimer, the term of this patent is extended or adjusted under 35 U.S.C. 154(b) by 0 days.

(21) Appl. No.: 15/835,807

(22) Filed: Dec. 8, 2017

(65) Prior Publication Data

US 2018/0096271 A1 Apr. 5, 2018

Related U.S. Application Data

(63) Continuation-in-part of application No. 15/168,675, filed on May 31, 2016.

(Continued)

(51) Int. Cl.
*H04M 3/00* (2006.01)
*H04M 5/00* (2006.01)
(Continued)

(52) U.S. Cl.
CPC ..... *G06Q 10/0635* (2013.01); *G06F 17/2785* (2013.01); *G06N 99/005* (2013.01); *G10L 15/02* (2013.01); *G10L 15/08* (2013.01); *G10L 15/22* (2013.01); *G10L 17/02* (2013.01); *H04M 3/5175* (2013.01); *H04M 3/5232* (2013.01); *G06N 5/02* (2013.01); *G10L 17/26* (2013.01); *G10L 25/51* (2013.01); *G10L 25/63* (2013.01);
(Continued)

(58) Field of Classification Search
CPC .......... H04M 3/42221; H04M 3/5232; H04M 2203/556; H04M 2203/551; H04M 3/5191
USPC .............. 379/265.07, 265.05, 265.06, 266.1, 379/265.03
See application file for complete search history.

(56) References Cited

U.S. PATENT DOCUMENTS 6,882,723 B1 * 4/2005 Peterson ............ G06Q 10/0639
379/265.01
6,898,277 B1 * 5/2005 Meteer ................ H04M 3/5166
379/265.02

(Continued)

OTHER PUBLICATIONS

Non-Final Office Action dated Jan. 24, 2018 of U.S. Appl. No. 15/168,675 by Raanani, R., et al., filed May 31, 2016.

(Continued)

*Primary Examiner* — Thjuan K Addy
(74) *Attorney, Agent, or Firm* — Perkins Coie LLP

(57) ABSTRACT

A risk identification system automatically determines deals at risk by analyzing conversations of representatives with customers. The risk identification system retrieves recordings of various conversations, extracts features of each of the conversations, and analyzes the features to determine if any of the conversations includes features that are indicative of a deal discussed in that conversation being at risk. By performing such an analysis of conversations, the risk identification system can identify a number of deals that are at risk and generate a report of such deals and notify a consumer user of the risk identification system of such deals.

32 Claims, 10 Drawing Sheets

Related U.S. Application Data

(60) Provisional application No. 62/169,456, filed on Jun. 1, 2015, provisional application No. 62/169,445, filed on Jun. 1, 2015.

(51) Int. Cl.

| | | |
|---|---|---|
| *G06Q 10/06* | (2012.01) | |
| *G10L 15/22* | (2006.01) | |
| *G10L 15/08* | (2006.01) | |
| *G10L 15/02* | (2006.01) | |
| *G06F 17/27* | (2006.01) | |
| *G06N 99/00* | (2010.01) | |
| *H04M 3/51* | (2006.01) | |
| *H04M 3/523* | (2006.01) | |
| *G10L 17/02* | (2013.01) | |
| *G06N 5/02* | (2006.01) | |
| *G10L 25/51* | (2013.01) | |
| *G10L 25/63* | (2013.01) | |
| *H04M 3/42* | (2006.01) | |
| *G10L 17/26* | (2013.01) | |

(52) U.S. Cl.
CPC ... *G10L 2015/088* (2013.01); *H04M 3/42221* (2013.01); *H04M 2201/40* (2013.01); *H04M 2203/357* (2013.01); *H04M 2203/556* (2013.01)

(56) References Cited

U.S. PATENT DOCUMENTS

| | | |
|---|---|---|
| 7,023,979 B1 | 4/2006 | Wu et al. |
| 7,487,094 B1 | 2/2009 | Konig et al. |
| 7,729,916 B2 | 6/2010 | Coffman et al. |
| 8,165,886 B1 | 4/2012 | Gagnon et al. |
| 8,346,563 B1 | 1/2013 | Hjelm et al. |
| 8,914,285 B2 | 12/2014 | Pollak et al. |
| 9,635,178 B2 | 4/2017 | Raanani et al. |
| 9,900,436 B2 | 2/2018 | Raanani et al. |
| 2004/0098274 A1 | 5/2004 | Dezonno et al. |
| 2004/0249632 A1 | 12/2004 | Chacon |
| 2005/0197841 A1 | 9/2005 | Al-Dhubaib et al. |
| 2007/0038499 A1 | 2/2007 | Margulies et al. |
| 2007/0265850 A1 | 11/2007 | Kennewick et al. |
| 2008/0103781 A1 | 5/2008 | Wasson et al. |
| 2008/0140415 A1 | 6/2008 | Shostak |
| 2009/0150156 A1 | 6/2009 | Kennewick et al. |
| 2009/0222313 A1 | 9/2009 | Kannan et al. |
| 2012/0072254 A1 | 3/2012 | McLean et al. |
| 2014/0025376 A1 | 1/2014 | Wasserblat et al. |
| 2014/0086402 A1 | 3/2014 | Kan et al. |
| 2014/0270133 A1 | 9/2014 | Conway et al. |
| 2014/0317030 A1 | 10/2014 | Shen et al. |
| 2015/0201077 A1 | 7/2015 | Konig et al. |
| 2015/0237213 A1 | 8/2015 | Spottiswoode et al. |
| 2015/0242860 A1 | 8/2015 | Kannan et al. |
| 2015/0254675 A1 | 9/2015 | Kannan et al. |
| 2015/0256675 A1 | 9/2015 | Sri et al. |
| 2015/0348570 A1 | 12/2015 | Feast et al. |
| 2016/0225372 A1 | 8/2016 | Cheung et al. |
| 2016/0352902 A1 | 12/2016 | Levy et al. |
| 2016/0352907 A1 | 12/2016 | Levy et al. |
| 2017/0187880 A1 | 6/2017 | Raanani et al. |

OTHER PUBLICATIONS

Notice of Allowance dated May 4, 2018 of U.S. Appl. No. 15/168,675 by Raanani, R., et al., filed May 31, 2016.
Co-Pending U.S. Appl. No. 15/168,675 of Raanani, FL, et al., filed May 31, 2016.
Co-Pending U.S. Appl. No. 15/168,729 of Raanani, R., et al., filed May 31, 2016.
Corrected Notice of Allowability dated Mar. 21, 2017 of U.S. Appl. No. 15/168,729 of Raanani, R., et al., filed May 31, 2016.
Non-Final Office Action dated Oct. 20, 2016 of U.S. Appl. No. 15/168,729 of Raanani, R., et al., filed May 31, 2016.
Notice of Allowance dated Feb. 14, 2017 of U.S. Appl. No. 15/168,729 of Raanani, R., et al., filed May 31, 2016.
Non-Final Office Action dated Nov. 16, 2017 of U.S. Appl. No. 15/460,931 by Raanani, R., et al., filed Mar. 16, 2017.
Notice of Allowance dated Dec. 19, 2017 of U.S. Appl. No. 15/460,931 by Raanani, R., et al., filed Mar. 16, 2017.
U.S. Appl. No. 16/017,646 of Raanani, R. et al. filed Jun. 25, 2018.

* cited by examiner

ANALYZING CONVERSATIONS TO AUTOMATICALLY IDENTIFY DEALS AT RISK

CROSS-REFERENCE TO RELATED APPLICATION(S)

This application is a continuation-in-part of U.S. application Ser. No. 15/168,675 titled "MODELING VOICE CALLS TO IMPROVE AN OUTCOME OF A CALL BETWEEN A SALES REPRESENTATIVE AND A CUSTOMER" filed May 31, 2016, which claims the benefit of U.S. Provisional Application Ser. No. 62/169,456 titled "MODELING VOICE CALLS TO IMPROVE AN OUTCOME OF A CALL BETWEEN A SALES REPRESENTATIVE AND A CUSTOMER" filed Jun. 1, 2015, and U.S. Provisional Application Ser. No. 62/169,445 titled "COORDINATING VOICE CALLS BETWEEN SALES REPRESENTATIVES AND CUSTOMERS TO INFLUENCE AN OUTCOME OF THE CALL" filed Jun. 1, 2015, all of which are incorporated herein by reference for all purposes in their entirety.

BACKGROUND

With over 2.4 million non-retail inside sales representatives in the United States (U.S.) alone, millions of sales phone conversations are made on a daily basis.[i] However, except for rudimentary statistics concerning e.g., call length and spotted keywords and phrases, sales conversations are left largely unanalyzed, rendering their content inaccessible to modeling, and precluding the ability to optimize them for desired outcomes. Recent advances in automatic speech recognition (ASR) technologies, and specifically in large vocabulary continuous speech recognition (LVCSR), are for the first time enabling high-accuracy automatic transcription of conversations. At the same time, natural language processing (NLP) approaches to both topic modeling and world-knowledge modeling, have become much more efficient due to the availability of large, freely accessible natural language corpora (e.g., CommonCrawl), as well as freely available ontologies or "knowledge graphs" (e.g., DBpedia). Finally, recent research on affect identification applying machine learning (ML) has been able to successfully model subjective aspects of emotion and personality traits as perceived by listeners.

[i] Insidesales.com "Market size 2013" study

DETAILED DESCRIPTION

Figure 1:
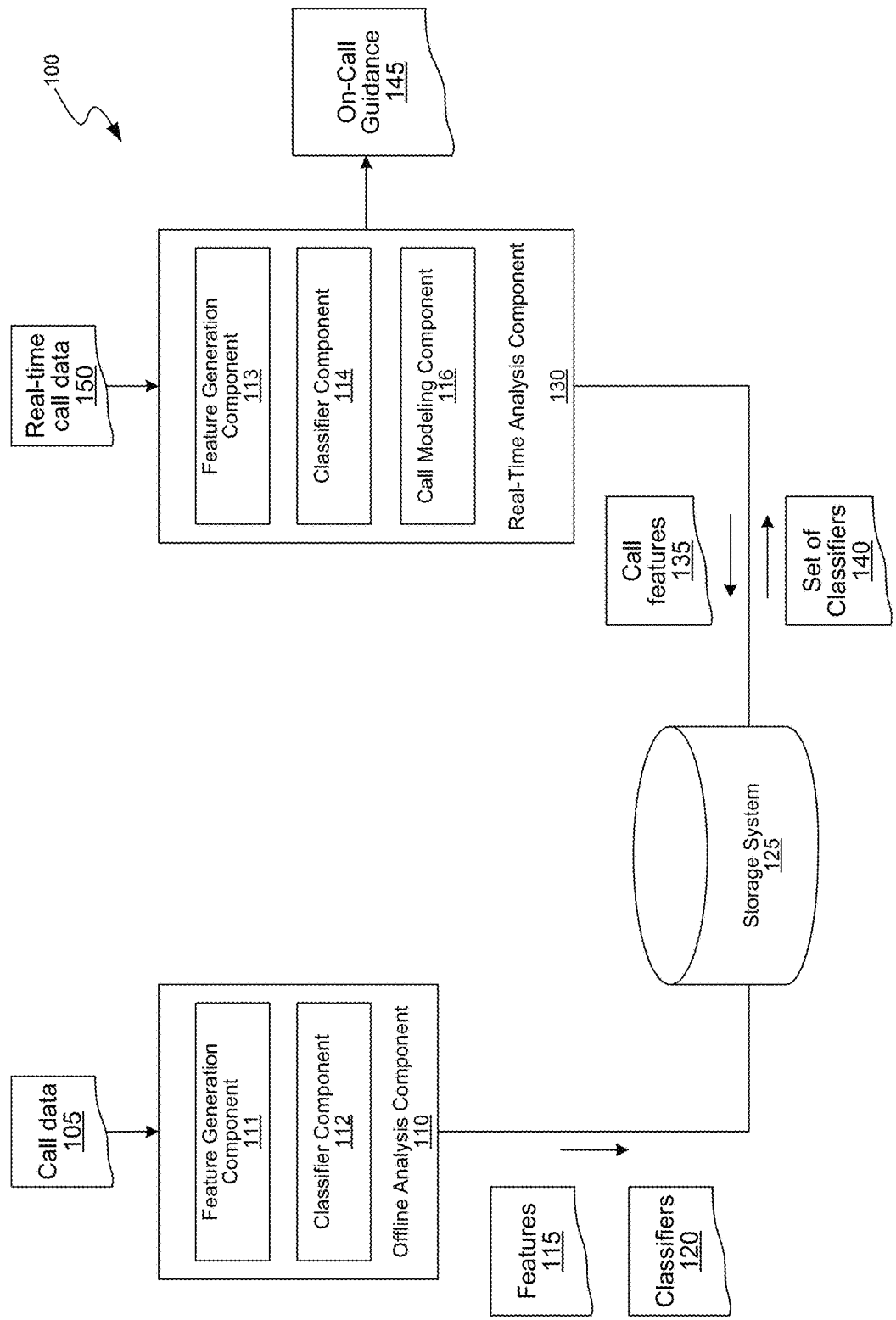
FIG. 1 is a block diagram of a call-modeling system in which the disclosed embodiments can be implemented.

Embodiments are disclosed for a call-modeling system for modeling conversations, e.g., voice conversations, in real time, with the goal of helping users, e.g., sales representatives and/or their managers, to improve and/or guide the outcome of conversations with other users, e.g., customers. One such embodiment can model the calls based on characteristics of the conversation, e.g., voice of the representatives and/or the customers, and content of the conversation, with the goal of positively influencing the outcome of the call. The call-modeling system can generate real-time probabilities for possible outcomes of a real-time conversation, e.g., an ongoing conversation between a specific representative and a customer, and generate specific on-call guidance, which may be either conducive or detrimental to a desired conversation outcome. The generated probabilities and on-call guidance may be used by the representatives and/or their managers to either increase the probability of a desired outcome and/or optimize the conversation for a specified duration if the predicted outcome is not going to be a desired outcome. For example, for renewing a magazine subscription, the call-modeling system can generate an on-call guidance suggesting a representative to engage in a rapport building exercise with the customer if it is determined that doing so increases the chances of the customer renewing the membership by 45%. On the other hand, if the call-modeling system predicts from the on-going conversation that the customer is not going to renew the subscription membership, then the call-modeling system can suggest the representative to wrap up the conversation as soon as possible.

The call-modeling system can include (i) an offline analysis component and (ii) a real-time analysis component. The offline analysis component can take as input conversations between a calling party, e.g., a customer, and a called party, e.g., a representative, and process the conversations using multiple distinct components to generate multiple features of the conversations. In some embodiments, the conversations can be audio recordings of calls between called party and the calling party (collectively referred to as "participants"). The features can include transcripts of audio recordings, vocabulary, semantic information of conversations, summarizations of utterances and various natural language entailments, summarization of a call, voice signal associated features (e.g., a speech rate, a speech volume, a tone, and a timber), emotions (e.g., fear, anger, happiness, timidity, fatigue), personality traits (e.g., trustworthiness, engagement, likeability, dominance, etc.), personal attributes (e.g., an age, an accent, and a gender), customer-representative pair attributes that indicate specific attributes associated with both the speakers that contribute to a specified outcome (e.g., similarity of speech rate between the representative and the customer, extrovert/introvert matching, or gender or age agreement).

Note that a recording of the conversation can be of a conversation that is any of telephone based, Voice over Internet Protocol (VoIP) based, video conference based, Virtual Reality (VR) based, Augmented Reality (AR) based, or based on any online meetings, collaborations or interactions, electronic mail (e-mail). The recording can also be of a conversation that has happened between two or more speakers physically located in the same room. In some embodiments, a recording based on any online meetings, collaborations or interactions, or email can be a transcript of the corresponding interaction.

Further, the features can include not only aural features, but also non-aural features, e.g., visual features such as body language of a participant, and facial expressions of the participant, or any combination of aural and non-aural features. The features could also be generated from the transcripts of any of emails, online messages, and online meetings. In some embodiments, any of a word, a phrase, a text, emoji, symbols, or a combination thereof can be used to determine a particular feature. For example, it can be determined that a text such as "Ha Ha" or "rofl" in the transcript can indicate laughter.

In some embodiments, the audio recordings can be tagged with various tags, e.g., a tag that indicates a trait (e.g., "extrovert", "trustworthy voice", "anxious", etc.) of one or more of the participants, a tag that indicates a call outcome (e.g., "sales closed", "sales failed", or "follow-up call scheduled"), and/or a tag that indicates "key moments" of a conversation. A "key moment" or a "moment" can be a specific event or a specific characteristic which occurs in the call. The event can be any event that is of specific interest for a specific application for which the call-modeling system is being implemented. An administrator of the call-modeling system can configure what events in a call have to be identified as a moment. For example, a moment can be laughter, engagement, fast-talking, open-ended questions, objections, or any combination thereof in a conversation. In some embodiments, the moments are identified automatically by a moment identification system. The tags can be generated automatically by the call-modeling system, manually, e.g., by human judgment, or both. In some embodiments, the tags are generated automatically by the call-modeling system. The tag can include various details, e.g., information regarding a moment, a time interval at which the moment occurred in the call, duration for which the moment lasted, information regarding the participants of the call, etc.

The moments can also be notified to and/or shared between the participants during an on-going conversation and/or after the conversation. For example, during a call between a customer and a representative, the call-modeling system can analyze the call, identify the moments in the conversation, and tag, notify and/or share the moments with the representative's manager, peers or other people. The shared moments can be used for various purposes, e.g., for coaching the representatives in handling the calls to improve outcomes of the calls based on various situations. The moments can be shared using various means, e.g., via email, a chat application, or a file sharing application.

In some embodiments, the offline analysis component uses distinct components to extract the features. The components can include an automatic speech recognition (ASR) component, which can produce a transcription of the conversation, a natural language processing (NLP) component, which can extract semantic information (such as open-ended questions asked, key objections, etc.) from the conversation, an affect component, which can analyze the recording for emotional signals and personality traits (e.g., likeability and trustworthiness), and a metadata component, which can extract data regarding conversation flow (i.e., who spoke when, and how much silence and overlap occurred).

The offline analysis component can analyze the features to generate one or more classifiers that indicate conversation outcomes, e.g., "sales closed", "sales failed." Each of the classifiers indicates a specific outcome and can include a set of features that contribute to the specific outcome. The offline analysis component can generate multiple classifiers for the same outcome; however, the multiple classifiers can have distinct sets of features. In some embodiments, the offline analysis component can analyze the features using a machine learning algorithm (e.g., a linear classifier, such as a support vector machine (SVM), or a non-linear algorithm, such as a deep neural network (DNN) or one of its variants) to generate the classifiers.

In some embodiments, the offline analysis component generates a classifier for different time intervals or time windows of the conversations. For example, the offline analysis component can analyze the extracted features for seconds 00:05-00:10 of a conversation, seconds 00:20-00:30, and minutes 1:00-2:00, and generate a classifier for each of those time windows. The offline analysis component feeds the extracted features into the machine-learning algorithm to produce multiple classifiers corresponding to the time windows. The time windows can be of varying lengths or fixed lengths. In some embodiments, the offline analysis component can generate classifiers for other relative positions of a conversation. For example, the offline analysis component can generate a classifier corresponding to an instance in the conversation, e.g., when a customer spoke for the first time in the conversation, and analyze features such as a pitch of the voice, a topic the customer spoke about first, and the length of the customer's first talk, to generate the classifier.

The real-time analysis component uses the classifiers to model a real-time conversation, e.g., an ongoing call between a representative and a customer, that helps the representative to increase a probability of a desired outcome of the conversation or optimize the conversation duration in case the real-time analysis component does not predict the desired outcome. The real-time analysis component receives real-time call data of an ongoing conversation between the customer and a representative and analyzes the real-time call data to generate a set of features, e.g., using the offline analysis component as described above. The real-time analysis component can then feed the features to the classifiers to generate probabilities of potential outcomes of the call. The real-time analysis component can use the classifiers with highest prediction powers to generate the probabilities of various potential outcomes. In some embodiments, the real-time analysis component measures the prediction powers of the classifiers using an F-score, which, in statistical analysis, is a (possibly weighted) harmonic mean of precision and recall.

The real-time analysis component feeds the extracted features into the classifiers with high F-scores to generate probabilities of possible outcomes. Based on the probabilities, the real-time analysis component can also generate on-call guidance, which encourages the representative and/or their managers to modify, desist or persist with a specified on-call behavior to increase or decrease the probability of one of the possible outcomes, e.g., a desired outcome such as closing a sale. In some embodiments, the on-call guidance includes a set of suggested features and their values to be adopted, desisted or persisted with by the representative. For example, the on-call guidance can include instructions for the representative to change the rate of speech (e.g., speak slower), use specific key words, or pose more open-ended questions to the customer.

In some embodiments, the on-call guidance can change as the call progresses, e.g., based on the classifiers that are relevant to the call at that particular time of the conversation. For example, during the first two minutes of the call, a classifier that corresponds to the first two minutes of the call may be used to generate the on-call guidance such as instructing the representative to pose open-ended questions to the customer, and then in the third minute, a classifier that corresponds to the third minute of the call may be used to revise the on-call guidance, e.g., suggest to the representative to adjust the speech rate to match with that of the customer.

Additionally, if according to the classifiers, the real-time analysis component predicts the conversation to fail, the on-call guidance may suggest to the representative to quickly wrap up the call in order to spare the representative's time. The on-call guidance of the real-time analysis module may be presented on-screen or via any other interface (e.g., voice instructions given through an ear piece) to the representative and/or the manager. The embodiments can produce real-time probabilities of various outcomes of the conversations, enabling live coaching that can help the representatives in improving the outcomes of the conversations in real-time.

Embodiments are also disclosed for a risk identification system that identifies deals that are at risk, e.g., deals at risk of not closing or other suboptimal outcome, based on an analysis of the conversations between the representatives and the customers. The risk identification system retrieves the recordings of various conversations, extracts features of each of the conversations, and analyzes the features to determine if any of the conversations includes features that are indicative of a deal discussed in that conversation being at risk. By performing such an analysis of the conversations, the risk identification system can identify a number of deals of the organization that are at risk, generate a report identifying the deals at risk and a reason why a particular deal is at risk, and notify a consumer user of such deals. A consumer user can be a representative, a sales manager, or a vice president of sales, or any other user who consumes information regarding deals at risk. The risk identification system can notify the consumer user regarding the deals at risk in various ways. For example, the risk identification system can notify the consumer user regarding the deals at risk via an electronic mail (e-mail). In another example, the risk identification system can notify the consumer user regarding the deals at risk by generating an alert on a display of a user device associated with the consumer user. In yet another example, the risk identification system can provide a graphical user interface (GUI) for the consumer user to view information regarding the deals at risk on demand. The risk identification system can analyze the conversations to identify the deals at risk automatically, e.g., based on a predefined schedule, or on demand, e.g., based on a request from the consumer user.

Further, in some embodiments, the risk identification system not only identifies the deals at risk, but also determines one or more reasons why a particular deal is at risk and present the reason in the report. The risk identification system can determine the reason based on the features that are indicative of the deal being at risk. The risk identification system determines that a deal is at risk if the deal satisfies a risk criterion. In some embodiments, the risk criterion can be specified by the consumer user. Some examples of the risk criterion include any of losing a deal, reduction in budget of the deal, or deferral of a timeline for closing the deal, or any other suboptimal outcome. In some embodiments, the risk criterion can be any criterion that is specified by the consumer user.

The risk identification system can determine that the deal is at risk based on various types of indicators, e.g., "sales process indicators" and "conversational indicators." The sales process indicators could be associated with sales activity of a customer and can include indicators such as decreased activity on a sales account associated with the customer, lack of updates to the account, or delayed follow-ups by the representatives with the customer. The conversational indicators that are indicative of a deal being at risk can be derived, e.g., as features, from the conversations between the representatives and the customers. The risk identification system analyzes the features of a conversation to determine if any of the features satisfy the risk criterion, and if any of the features satisfy the risk criterion, the deal is determined to be at risk. The features to be analyzed could be any of the various features described above. In some embodiments, the risk identification system can extract features based on the usage of words or phrases in the conversation. For example, the risk identification system can identify words or phrases in the conversation such as "we don't have the budget for it," "this is not the right time for us," "could not review yet," "it is not a priority for us," "I do not have the authority to finalize," as satisfying the risk criterion, and therefore, determine a deal associated with a conversation having such features to be at risk. In some embodiments, the conversational indicators may not be as explicit as the above features but implicit and subtle. For example, the risk identification system can identify words or phrases used by the customer that are indicative of hesitation, which can include qualifying phrases such as "to be honest with you I don't know how," or "I'm not entirely sure what this would do for," as features that are indicative of the deal being at risk.

While the above paragraphs describe analyzing a conversation with respect to language based features, the risk identification system is not restricted to analyzing such features to determine if a deal is at risk; the risk identification system can use any feature that can be indicative of the risk criterion being satisfied. For example, the risk identification system can determine if the deal is at risk based on video features, such as facial expression or body language of the customer during the discussion of the deal. In another example, the risk identification system can determine if the deal is at risk based on a tone of the customer's speech, rate of the speech, talk-listen ratio of the customer, etc. The risk identification system determines that the deal is at risk based on one or more of the multiple features described above. The risk identification system can be trained using artificial intelligence (AI) or machine learning (ML) techniques to extract the features from the conversations and/or analyze the features to determine if a corresponding deal is at risk. Further, in some embodiments, as the risk identification system is trained more and more, e.g., using AI and ML techniques, to extract and analyze the features, the number of features extracted for the same conversation can vary, e.g., more or less than the features that were extracted in prior analyses. This can be because the accuracy of the risk identification system improves with training, e.g., using AI and ML techniques. For example, if the risk identification system extracts "10" features for a specified conversation at a given time, it can extract more or less than "10" features for the same specified conversation after it is trained to analyze "50" additional conversations. That is, the risk identification system learns of new features and/or forgets old features that are not relevant anymore as the risk identification system is trained more and more (e.g., made to extract and/or analyze features from additional conversations). In some embodiments, the consumer user can also define whether a particular feature satisfies the risk criterion, and the risk identification system can further learn based on the user-defined criterion, e.g., the risk identification system can determine, using AI and ML techniques, what other similar or additional features satisfy the risk criterion.

In some embodiments, the risk identification system can also determine one or more reasons for the deal to be at risk. The reason can be determined based on one or more features that satisfy the risk criterion. For example, if the risk identification system determines that the deal is at risk because of the feature "this is not the right time for us," then the risk identification system can determine the reason as "timeline issues." In another example, if the risk identification system determines that the deal is at risk because of the feature "could not review yet" and "low budget," then the risk identification system can determine the reasons as "insufficient time for reviewing the deal" and "lack of budget." In yet another example, if the risk identification system determines that the deal is at risk because of a feature that indicates that customer did not pay attention to what the representative was talking during the conversation, then the risk identification system can determine the reason as "customer not attentive during the conversation." In some embodiments, the risk identification system can determine that the customer did not pay attention to the representative based on voice signal associated features (e.g., a speech rate, a speech volume, a tone, and a timber), emotions (e.g., fear, anger, happiness, timidity, fatigue), personality traits (e.g., trustworthiness, engagement, likeability, dominance, etc.), talk-listen ratio of the customer, or if the customer responded to the representative only after the representative prompted the customer a number of times.

Further, in some embodiments, if the risk identification system is not able to determine the exact reason of why the deal is at risk, the risk identification system may indicate to schedule a follow up call with the customer. The consumer user may then schedule a follow-up call with the customer to discuss the deal further. For example, if the risk identification system determines that the deal is at risk because of conversational indicators such as "to be honest with you I don't know how," then the risk identification system can determine the reason as "Customer not sure—Schedule follow up call to clarify."

In some embodiments, the risk identification system can generate a report of the deals at risk. The report can include information such as one or more of deal identification (ID) of deals that are determined to be at risk, a reason why a particular deal is at risk, recording ID of one or more recordings in which the deal is discussed, representative ID of the representative involved in the conversation. The report can also additional information such as the most common reasons for the deals determined to be at risk. For example, the report can include a graph that depicts the most common reasons for the deals determined to be at risk.

Turning now to FIG. 1, FIG. 1 is a block diagram of a call-modeling system 100 in which the disclosed embodiments can be implemented. The call-modeling system 100 includes an offline analysis component 110 and a real-time analysis component 130. The offline analysis component 110 can take as input historical call data 105, which includes conversations between participants, e.g., audio recordings of calls between representatives and customers, and process the call data 105 using multiple components to generate features 115 of the conversations, and classifiers 120.

The offline analysis component 110 includes a feature generation component 111 that generates features 115 by analyzing the call data 105 using various techniques, e.g., ASR, NLP, artificial intelligence (AI), machine learning (ML). The features 115 can include transcripts of audio recordings, vocabulary, semantic information of conversations, summarization of a call, summarizations of utterances and various natural language entailments, voice signal associated features (e.g., speech rate, speech volume, tone, and timber), emotions (e.g., fear, anger, happiness, timidity, fatigue), personality traits (e.g., trustworthiness, engagement, likeability, dominance, charisma, confidence, etc.), personal attributes (e.g., age, accent, and gender), and inter-speaker attributes that indicate a comparison between both the speakers (e.g., similarity of speech rate between the representative and the customer, extrovert/introvert matching, or gender or age agreement). Further, the features can include not only aural features, but also non-aural features, e.g., visual features such as body language of a participant, and facial expressions of the participant, or any combination of aural and non-aural features.

The classifier component 112 analyzes the features 115 using various techniques, e.g., machine learning algorithms such as SVM, DNN, to generate the classifiers 120. The classifiers 120 indicate conversation outcomes, e.g., "sales closed", "sales failed," "probability of recommending to a friend," a measure of "customer satisfaction," and Net Promoter Score (NPS). An outcome can have binary values, e.g., "yes/no", "high/low", or non-binary values, e.g., a probability score, enumerated values like "low, average, medium, high, very high," values on a scale of 0-10, etc. For example, an outcome such as customer satisfaction can be measured using binary values such as "low/high", or using non-binary values, such as a scale of 0-10, enumerated values. Each of the classifiers indicates a specific outcome, a probability of the specified outcome and can include a set of the features that contributed to the specific outcome. For example, in a sales call for renewing a magazine subscription, a classifier "C1" can indicate that when laughter by a customer and two open-ended questions from the representative are registered, there is a high chance, e.g., 83%, of renewal.

In some embodiments, the classifier component 112 generates different classifiers for different time windows of the conversations. For example, the classifier component 112 generates a classifier "C1" for the first two minutes of the conversations and a classifier "C2" for a third minute of the conversations. The classifier "C1" based on the first two minutes of the conversation can indicate that when laughter by a customer and two open-ended questions from the representative is registered, there is a high chance, e.g., 83%, of renewal. The classifier "C2" based on the third minute of the conversation can indicate that when a competitor magazine or the key-phrase "read online" is used, the renewal chances drop to 10%, all of which can occur if customer's speech rate drops below three words per second. Some of the classifiers include features for inter-speaker attributes that indicate a comparison between the speakers that contribute to a specified outcome (e.g., similarity of speech rate between the representative and the customer, extrovert/introvert matching, or gender or age agreement).

The features, when extracted from the conversations, can include attributes and values. The classifier determines what values of the features influence a particular outcome of the call. The classifiers 120 can be generated in various formats and is not limited to the above illustrated example format. The classifier component 112 can generate multiple classifiers for the same outcome; however, the multiple classifiers can have distinct sets of features. Further, as described above, the classifier component 112 can generate different classifiers for different time windows of the conversation. The offline analysis component 110 can store the features 115 and the classifiers 120 in a storage system 125.

The call-modeling system 100 includes a real-time analysis component 130 that uses the classifiers 120 to generate on-call guidance for both inbound and outbound calls that will help the representative optimize the call for a desired outcome, or optimize the call duration if the desired outcome is not predicted (i.e., very low chances of the desired outcome are predicted). The real-time analysis component 130 receives real-time call data 150 of an ongoing conversation between a customer and a representative and analyzes the real-time call data 150 to generate a set of features, e.g., call features 135, for the ongoing conversation using a feature generation component 113. In some embodiments, the feature generation component 113 is similar to or the same as the feature generation component 111. The feature generation component 113 generates the call features 135 based on the real-time call data 150, e.g., as described above with respect to the feature generation component 111. The real-time call data 150 can be an early-stage or initial conversation between the customer and the representative.

After the call features 135 are generated, a classifier component 114, which, in some embodiments, is the same as, or similar to the classifier component 112, inputs the call features 135 to the classifiers 120 to determine a set of classifiers 140 that predict possible outcomes of the call based on the call features 135. Each of the set of classifiers 140 indicates a specified outcome of the call and an associated probability of the corresponding outcome. In some embodiments, the classifier component 114 chooses classifiers that have the highest prediction power, which can be measured using an F-score, as the set of classifiers 140. After the set of classifiers 140 are determined, a call-modeling component 116 generates an on-call guidance 145 that includes real-time probabilities of possible outcomes of the call as indicated by the set of classifiers 140. The call-modeling component 116 can further analyze the set of classifiers 140 to determine features that have high prediction power, e.g., prediction power exceeding a specified threshold, for predicting a desired outcome, and include those features and values associated with those features in the on-call guidance 145. The on-call guidance 145 notifies the representative to adopt, desist or persist with an on-call behavior consistent with those features to achieve the desired outcome, or to increase the probability of achieving the desired outcome. If the set of classifiers 140 predict that the desired outcome may not be achieved, the call-modeling component 116 may suggest, in the on-call guidance 145, that the representative wrap up the call.

The call data 105 can be in various formats, e.g., audio recordings, transcripts of audio recordings, online chat conversations. Similarly, the real-time call data 150 can be in various formats, e.g., real-time audio stream of the call, a chat transcript of an ongoing conversation in an online chat application. Further, the real-time call data 150, which can include an initial or early stage conversation, can be a conversation between the customer and an automated machine, e.g., an interactive voice response (IVR) system, or a representative for gathering preliminary information from the customer that can be useful for generating the on-call guidance.

In some embodiments, the call-modeling system 100 includes a search tool that empowers a consumer user to explore various aspects of a conversation. For example, the search tool allows the consumer user to search for anything that came up on the call, e.g., both linguistic and meta-linguistic. The search tool can be used to further analyze the conversation, extract appropriate features and use them to improve the classifiers in predicting the outcome of the calls. For example, the search tool can be used to find calls that registered a laughter from the customer, calls in which the customer spoke for the first time after a specified number of minutes, calls in which the customer sounded angry, calls in which customer mentioned competitors, calls in which the representatives engaged in rapport building, calls in which the representative modulated speech rates at various instances of the call, calls in which short or open-ended questions were asked at a high frequency, or any combination of the above.

Figure 2:
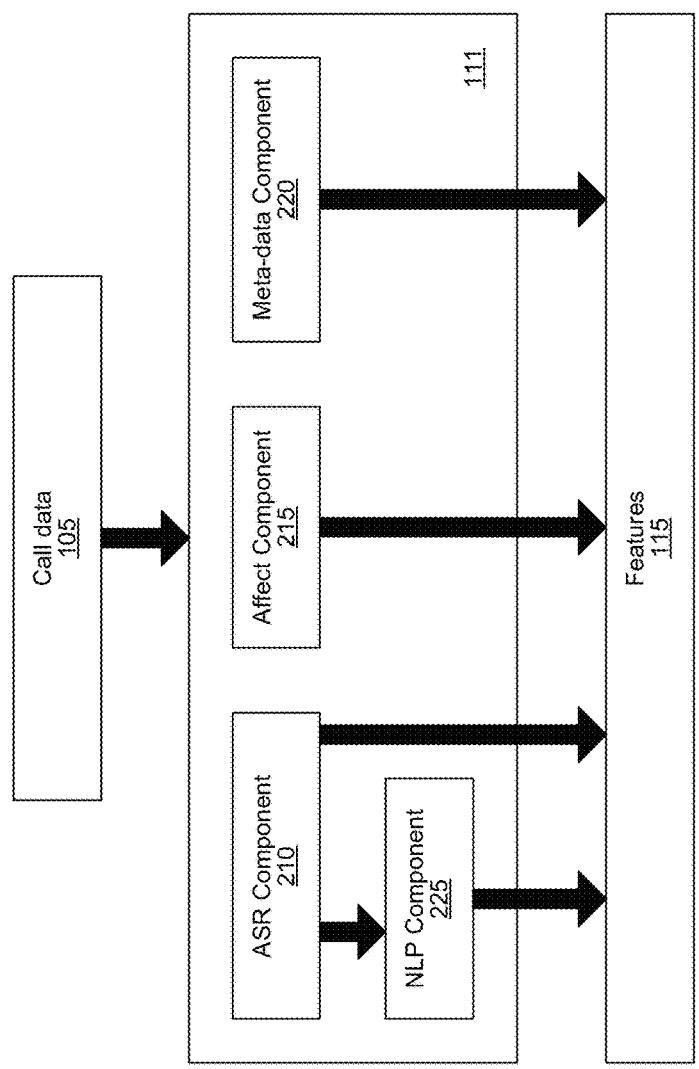
FIG. 2 is a block diagram of a feature generation component of the call-modeling system for extracting features from call data, consistent with various embodiments.

FIG. 2 is a block diagram of a feature generation component of FIG. 1 for extracting features from call data, consistent with various embodiments. In some embodiments, the feature generation component 111 includes an ASR component 210, an NLP component 225, an affect component 215 and a metadata component 220. The ASR component 210 can analyze call data 205, e.g., a voice recording, and produce a transcription, vocabulary, and a language model of the conversation. The NLP component 225 can extract semantic information, such as key objection handling responses, from the output of the ASR component 210. The affect component 215 can analyze the call data 205 for emotional signals and personality traits (e.g., likeability, extroversion/introversion, charisma, confidence, and trustworthiness) as well as general personal attributes such as gender, age, and accent of the participants. The metadata component 220 can extract data regarding conversation flow (e.g., who spoke when, and how much silence and overlap occurred). In some embodiments, the above components can process the call data 105 in parallel. The output of the components can be generated as features 115 of the conversations, which can be analyzed to determine outcomes of the conversations.

The ASR component 210 may be tuned for specific applications, e.g., for sales calls. The features produced by the ASR component 210 may include full transcripts, vocabularies, statistical language models (e.g., transition probabilities), histograms of word occurrences ("bag of words"), weighted histograms (where words are weighted according to their contextual salience, using e.g., a Term Frequency—Inverse Document Frequency (TF-IDF) scheme), n-best results, or any other data available from the component's lattice, such as phoneme time-stamps, etc. The ASR component 210 may also be used to extract meta-linguistic features such as laughter, hesitation, gasping, background noise, etc. The ASR features can be extracted separately for the representative and the customer, and may be recorded separately for multiple speakers on each side of the conversation.

The NLP component 225 processes the text to produce various semantic features, e.g., identification of topics, identification of open-ended questions, identification of objections and their correlation with specific questions, named entity recognition (NER), identification of relations between entities, identification of competitors and/or products, identification of key phrases and keywords (either predetermined, or identified using salience heuristics such as TF-IDF), etc. Additional features that may be extracted by the NLP component 225 can be summarizations of utterances and various natural language entailments. The NLP features can be extracted separately for the representative and the customer, and may be recorded separately for multiple speakers on each side of the conversation.

The affect component 215 can extract low-level features and high-level features. The low-level features can refer to the voice signal itself and can include features such as speech rate, speech volume, tone, timber, range of pitch, as well as any statistical data over such features (e.g., maximal speech rate, mean volume, duration of speech over given pitch, standard deviation of pitch range, etc.). The high-level features can refer to learned abstractions and can include identified emotions (e.g., fear, anger, happiness, timidity, fatigue, etc.) as well as perceived personality traits (e.g., trustworthiness, engagement, likeability, dominance, charisma, confidence, etc.) and perceived or absolute personal attributes such as age, accent, and gender. Emotion identification, personality trait identification, and personal attributes, may be trained independently to produce models incorporated by the affect component, or trained using the human judgment tags optionally provided to the offline analysis component. In some embodiments, the affect component 215 can also extract features, such as a speaker engagement metric ("wow" metric), which measures how engaged a participant was in the conversation, e.g., based on the usage of vocabulary, rate of speech, pitch change. For example, the usage of phrase "Oh! cool" can indicate a higher degree of engagement than the phrase "cool!". In another example, the same phrase but said in different pitches or pitch ranges can indicate different degrees of engagement. All features extracted by the affect component 215 may or may not include a corresponding confidence level, which can be used in modeling outcomes. The affect features can be extracted separately for the representative and the customer, and may be recorded separately for multiple speakers on each side of the conversation.

The metadata component 220 can measure conversation flow, including speaker diarisation (e.g., which speaker spoke when and for how long), silence times and duration, as well as overlap of two or more speakers in addition to other metadata such as time of day call was placed, geographical destination of call and known gender and age of participants. The data extracted with the metadata component 220 may be collected separately for multiple speakers on each side of the conversation, or pooled together for representative and customer sides, respectively.

All components may extract features for a group of representatives, a single representative and/or a customer, including multiple parties on either side, and may be customized to optimize feature extraction accordingly. In addition, the features 115 may be extracted on the representative's recording alone, on the customer's recording alone, or on both. The features 115 may also include comparisons between extracted attributes. For example, the affect component 215 may extract as a feature a mean difference between representative and customer's speech rates, or a maximum difference between representative and customer's speech pitches. Likewise, the ASR component 210 may extract transcriptions and keywords both as a combined transcript and as two separate transcripts, and may be tuned with an acoustic or language model specific to a group of representatives or an individual representative. Similarly, the NLP component 225 may extract features such as open-ended questions with or without the corresponding response.

In some embodiments, the feature generation component 111 can also generate a set of features that indicate a blueprint of a conversation. The blueprint can represent a skeleton of the conversation and indicate a presence or absence of a particular aspect in the conversation. For example, the blueprint can include various features that indicate whether the conversation included any agenda setting, rapport building, clarification questions, defining goals, setting expectations, mentioning of examples. The blueprint can also help in predictive analysis of the outcome of the calls, e.g., by the classifier component 112. One or more components of the feature generation component 111 can use AL and/or ML techniques to extract one or more of the features 115.

Figure 3:
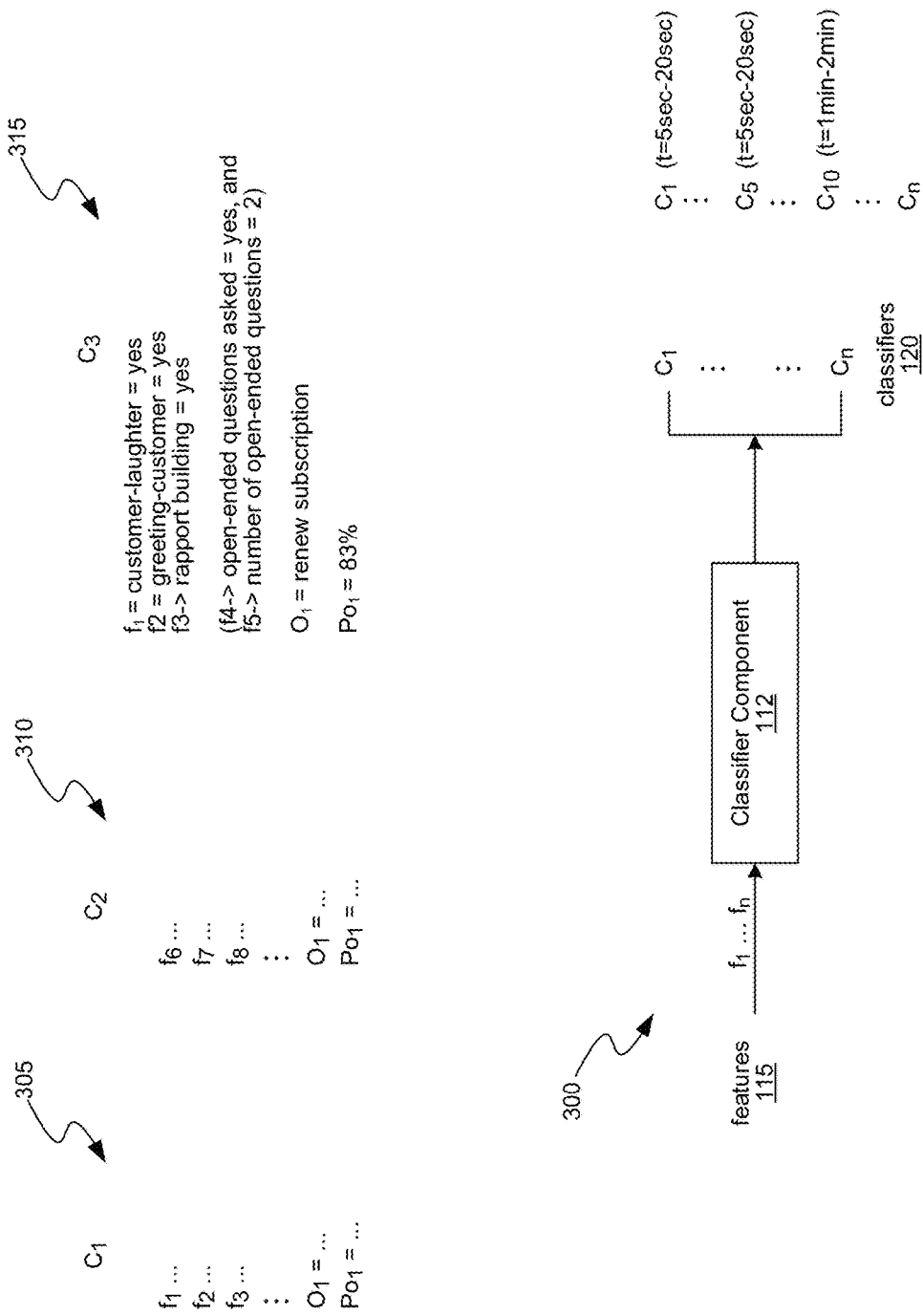
FIG. 3 is a block diagram of a classifier component of the call-modeling system for generating classifiers, consistent with various embodiments.

FIG. 3 is a block diagram of the classifier component for generating classifiers, consistent with various embodiments. The example 300 illustrates the classifier component 112 using the features 115 extracted from the feature generation component 111 to generate a number of classifiers, "C1"-"CN". In some embodiments, the classifier component 112 analyzes the features of a dedicated portion of the collected recordings, e.g., a training set, which is a subset of the entire recordings available for analysis, to generate the classifiers 120. Each of the classifiers 120 can have a value, e.g., an F-score, that indicates a prediction power of the classifier for the specified outcome. The higher the prediction power, the higher the probability of achieving the specified outcome of the classifier based on the included features. In some embodiments, the prediction power is determined by running the classifiers 120 on, e.g., a portion of call recordings that is not yet analyzed, e.g., a test set, and computing the respective F-score.

The classifiers 120 may be further analyzed to determine what features carry the largest prediction power, e.g., speech rate early in the conversation, occurrence of first interrupt by customer, names of competitors mentioned, or number of open questions thoughtfully answered, and a subset of these classifiers that have features with the largest prediction power can be used to generate the on-call guidance.

The conversation outcome depicted by the classifiers 120 can be any configurable outcome, e.g., "sales closed", "sales failed", "demo scheduled", "follow up requested," NPS-like probability of recommending to a friend, etc. In some embodiments, the features 115 extracted from the feature generation component 111 can be fed into a machine learning algorithm (e.g., a linear classifier, such as a SVM, or a non-linear algorithm, such as a DNN or one of its variants) to produce the classifiers 120. The classifiers may be further analyzed to determine what features carry the largest prediction powers (e.g., similarity of speech rate, occurrence of first interrupt by customer, extrovert/introvert matching, or gender or age agreement.)

The classifier component 112 can generate multiple classifiers for the same outcome. However, for a given outcome, different classifiers have different features. For example, the classifier component 112 can generate a first classifier 305, "C1," and a second classifier 310, "C2," for a specified outcome, "O1." However, the first classifier "C1" has a first set of features, e.g., features "f1"-"f3," and the second classifier "C2" has a second set of features, e.g., features "f5"-"f8." The features in different classifiers can have different prediction powers and contribute to the specified outcome in different degrees.

Different classifiers may be built for a different number of participants, and may consider multiple participants as a single interlocutor, or as distinct entities. Further, as described above, the classifier component 112 can generate different classifiers for different time intervals of a conversation. The classifier component 112 analyzes the features 115 extracted from the feature generation component 111 at various time intervals, e.g., seconds 00:05-00:10, seconds 00:20-00:30, minutes 1:00-2:00, covering the entire conversation duration, and generates one or more classifiers for each of those time intervals. Each classifier can correspond to a specified time interval of the conversation. For example, if "100" conversations are being analyzed, then the classifier component 112 can analyze first 5-20 seconds each of the "100" conversations and generate one or more classifiers for all the conversations corresponding to the interval of 5-20 seconds. Similarly, it can generate one or more classifiers corresponding to the 10-25 seconds interval. If more than one classifier is generated for a specified time interval, in some embodiments, different classifiers can have different outcomes, and in some embodiments, can have the same outcome; however, different classifiers will have different sets of features that contribute to the corresponding outcome. In the example 300, classifiers C1 and C5 correspond to a time window of seconds 00:05-00:20 of the conversations analyzed, and classifier C10 corresponds to minute 1:00-2:00 of the conversations.

The classifier 315, "C3," includes an example set of features extracted from analyzing various sales calls. The classifier 315 corresponds to the first two minutes of the conversations, and indicates that when laughter from the customer is registered and the representative greets the customer, indulges in rapport building and poses at least two open-ended questions, then there is a high chance, e.g., 83%, of renewal of a magazine subscription. The features and outcome of the classifier 315 "C3" can be "f1→customer laughter=yes" "f2→greeting customer=yes," "f3→rapport building=yes," ("f4→open ended questions asked=yes," and "f5→number of open ended questions asked=2"), "outcome=renew subscription" "probability of outcome=83%."

Figure 4:
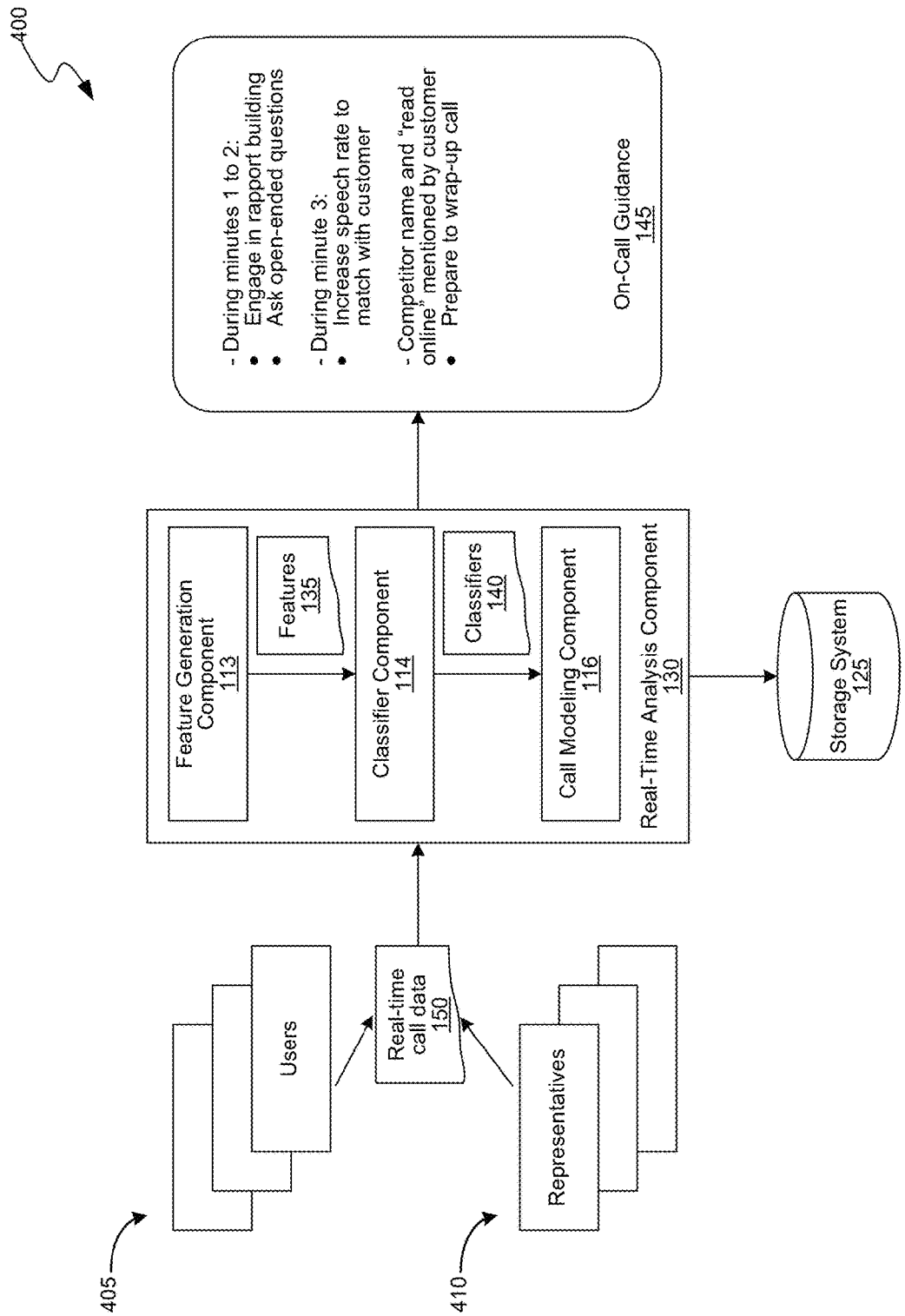
FIG. 4 is a block diagram of a real-time analysis component of the call-modeling system for generating on-call guidance for a representative during a call between the representative and a customer, consistent with various embodiments.

The classifiers 120 can be used by the real-time analysis component 130, e.g., as described at least with reference to FIG. 1 above and FIG. 4 below, to generate an on-call guidance for representatives or both inbound and outbound calls. FIG. 4 is a block diagram of the real-time analysis component of FIG. 1 for generating on-call guidance for a representative during a call between the representative and a customer, consistent with various embodiments. In some embodiments, the real-time analysis component 130 takes as input a live conversation stream, e.g., real-time call data 150, between a representative 410 and a customer 405, uses the feature generation component 113 to extract call features 135, e.g., as described above at least with reference to FIGS. 1 and 3.

The classifier component 114 feeds the call features 135 into the classifiers 120 generated by the offline analysis component 110 and selects a subset of the classifiers 120, e.g., a set of classifiers 140, that includes features that match with the call features 135 extracted from the live conversation stream. In some embodiments, the set of classifiers 140 chosen by the call-modeling component 116 are also the classifiers that have high predictability power, e.g., as measured using an F-score and that have an F-score exceeding a specified threshold.

The call-modeling component 116 then generates an on-call guidance 145, which includes information regarding real-time probabilities for specific outcomes to which the set of classifiers 140 correspond. The on-call guidance 145 may be used to notify the representative and/or their managers of the predicted outcome of the call. Additionally, the call-modeling component 116 can further analyze the set of classifiers 140 to determine classifiers that include features with the largest prediction powers, and present the values of those features in the on-call guidance 145 for suggesting the representative and/or their managers to modify or persist with an on-call behavior consistent with those features. For example, if one of the set of classifiers 140 predicts that conversations with rapport building and several open-ended questions being posed at the first few minutes of the conversation lead to favorable outcomes, the call-modeling component 116 may notify the representative and/or their managers as part of the on-call guidance 145 to engage in rapport building and pose questions at early stages of the conversation. Similarly, if one of the classifiers from the set of classifiers 140 indicates that matching speech rate to within 10% of customer's rate at a specified relative position of the call, e.g., during third minute of the call, leads to improved closing results, the call-modeling component 116 may notify the representative and/or their managers as part of the on-call guidance 145 to adjust their speech rate accordingly. On the other hand, if one of the classifiers from the set of classifiers 140 indicates that conversations beginning with over a specified number of objections, naming a specific competitor and mention of the phrase "read online" do not lead to good results, the call-modeling component 116 may notify the representative and/or their managers as part of the on-call guidance 145 to expedite wrap-up of conversations to avoid losing time on a call that is not likely to yield desired results.

In addition to live on-call guidance, the real-time analysis component 130 may be used to provide the representative and/or their managers with non-real time analysis as well, which provides insight into details of the conversations, e.g., what occurred in the conversations, when events occurred, and various such quantifiable analytics of the calls. For example, the classifiers can be used to find interesting calls that would interest the representatives to listen and learn from. The disclosed embodiments can be used to improve outcomes of the call not only during a real-time or a live call, but could also be used to inform representatives and/or managers for better training and coaching in retrospect.

The real-time analysis component 130 may also be used to auto-populate information fields in a customer relationship management (CRM) system or a similar system.

Figure 5:
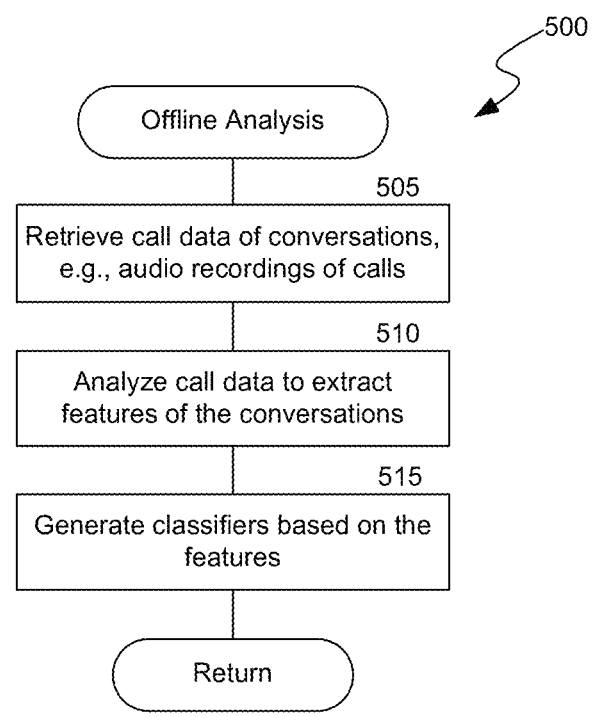
FIG. 5 is a flow diagram of a process for performing offline analysis of conversations between participants, consistent with various embodiments.

FIG. 5 is a flow diagram of a process 500 for performing offline analysis of conversations between participants, consistent with various embodiments. In some embodiments, the process 500 can be implemented in the call-modeling system 100 of FIG. 1. At block 505, the offline analysis component 110 retrieves historical call data, e.g., call data 105, regarding various conversations between participants, such as a customer and a representative. In some embodiments, the call data 105 can be audio recordings of calls between the participants, transcripts of audio recordings, chat transcripts, etc. The offline analysis component 110 can retrieve the call data 105 from the storage system 125. Further, in some embodiments, the call data 105 can include data regarding only a subset of the conversations stored in the storage system 125.

At block 510, the feature generation component 111 analyzes the call data 105 to extract various features of the conversation, e.g., as described at least with reference to FIGS. 1 and 2. Some example features include transcripts of audio recordings, vocabulary, semantic information of conversations, summarizations of utterances and various natural language entailments, voice signal associated features (e.g., speech rate, speech volume, tone, and timber), emotions (e.g., fear, anger, happiness, timidity, fatigue), inter-speaker features (e.g., similarity of speech rate between speakers, occurrence of first interrupt by customer, extrovert/introvert matching, or gender or age agreement), personality traits (e.g., trustworthiness, engagement, likeability, dominance, charisma, confidence, etc.) and personal attributes (e.g., age, accent, and gender). The feature generation component 111 can also analyze the call data 105 to generate various tags as described above.

At block 515, the classifier component 112 analyzes the features to generate classifiers, e.g., as described at least with reference to FIGS. 1 and 3. The classifier component 112 analyzes the features 115 using various techniques, e.g., machine learning algorithms such as SVM, DNN, to generate the classifiers 120. The classifiers 120 indicate conversation outcomes, e.g., "sales closed", "sales failed," "probability of recommending to a friend," NPS, or customer satisfaction. Each of the classifiers indicates a specific outcome and can include a set of the features that contributed to the specific outcome. For example, in a sales call for renewing a magazine subscription, a classifier "C1" can indicate that when laughter by a customer and two open-ended questions from the representative are registered, there is a high chance, e.g., 83%, of renewal. The classifier component 112 can generate multiple classifiers for the same outcome; however, they have distinct sets of features. Further, the classifier component 112 generates different classifiers for different time windows of the conversations. For example, the classifier component 112 generates a classifier "C1" for first two minutes of the conversations and a classifier "C2" for a third minute of the conversations. The offline analysis component 110 can store the features 115 and the classifiers 120 in a storage system 125.

Figure 6:
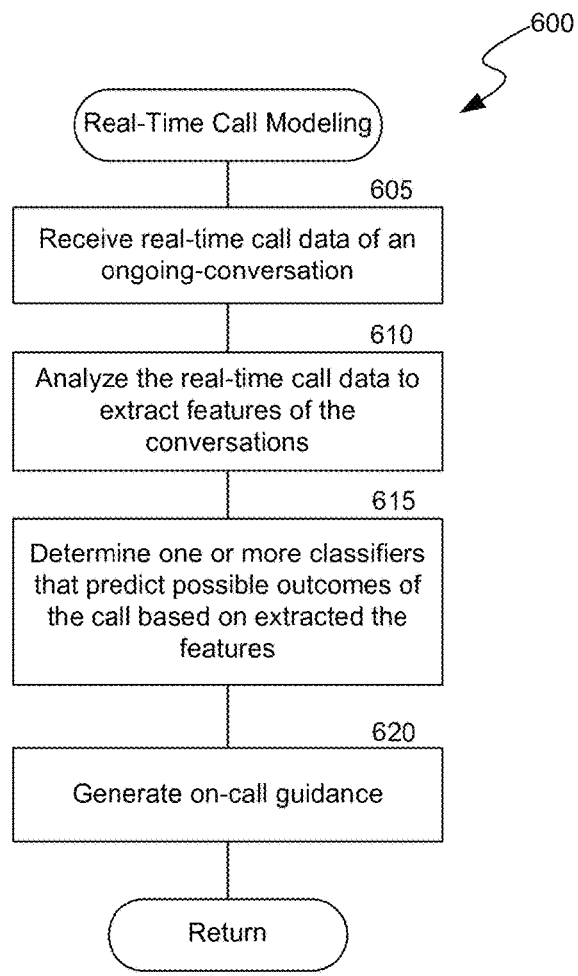
FIG. 6 is a flow diagram of a process for modeling calls between the participants to generate on-call guidance, consistent with various embodiments.

FIG. 6 is a flow diagram of a process 600 for modeling calls between participants to generate on-call guidance, consistent with various embodiments. In some embodiments, the process 600 can be implemented in the call-modeling system 100 of FIG. 1. At block 605, the real-time analysis component 130 receives real-time call data 150 of an ongoing conversation, e.g., an audio stream of a voice call between a customer and a representative. At block 610, the feature generation component 113 analyzes the real-time call data 150 to extract features, e.g., call features 135, of the ongoing conversation, e.g., as described at least with reference to FIGS. 1 and 2. The feature generation component 113 can also analyze the real-time call data 150 to generate various tags as described above.

At block 615, the classifier component 114 inputs the extracted features to classifiers in the storage system, e.g., classifiers 120 which are generated as described at least with reference to process 500 of FIG. 5, to determine one or more classifiers that predict possible outcomes of the call based on the extracted features. For example, as described at least with reference to FIGS. 1 and 4, the classifier component 114 feeds the extracted features 135 into the classifiers 120 generated by the offline analysis component 110, and selects a subset of the classifiers 120, e.g., a set of classifiers 140, that includes features that match with the call features 135 extracted from the live conversation stream. In some embodiments, the set of classifiers 140 include classifiers whose prediction power exceeds a specified threshold. The set of classifiers 140 corresponds to specific outcomes and include real-time probabilities for the specific outcomes.

At block 620, the call-modeling component 116 generates on-call guidance, e.g., on-call guidance 145, that presents the real-time probabilities of possible outcomes of the call as indicated by the set of classifiers 140. The call-modeling component 116 can further analyze the set of classifiers 140 to determine features that have high prediction power, e.g., prediction power exceeding a specified threshold, for predicting a desired outcome, and then include those features and values associated with those features in the on-call guidance 145. The on-call guidance 145 notifies the representative to adopt or persist with an on-call behavior consistent with those features to achieve the desired outcome, or at least to increase the probability of achieving the desired outcome. For example, the on-call guidance 145 can present instructions on a display screen of a user device associated with the representative recommending the representative to change the rate of speech, use specific key words, or pose more open-ended questions to the customer in order to increase the probability of achieving the desired outcome.

Example Usage of the Embodiments

The following is an example usage of the disclosed embodiments for modeling sales calls for renewal of a subscription for a magazine. At a first stage, e.g., before a call is received from a live customer or before a call is placed by a representative, a number of recordings of previous calls is processed by the offline analysis component 110, e.g., using an ASR component 210 that is customized for the field of surgery institutions, an NLP component 225, an affect component 215 and a metadata component 220 to generate various features. The classifier component 112 generates two classifiers, based on those features, that can be found to be highly predictive: (a) a first classifier based on the first two minutes of one or more of the analyzed conversations, which indicates that when a laughter by the customer is registered, the representative engages in rapport building, and at least two open-ended questions are posed by the representative, then there is a high chance, e.g., 83%, of subscription renewal; (b) a second classifier based on the third minute of one or more of the analyzed conversations, which indicates that when a competitor magazine or the key-phrase "read online" is used, and/or the speech rate of the customer is more than three words per second, the renewal chances drop to 10%.

The above two classifiers can then be used by the real-time analysis component 130 in a second stage, e.g., during a live call between the representative and the customer, for generating an on-call guidance to guide the sales representatives as follows. Based on the first classifier, the real-time analysis component 130 can indicate to the sales representative to ask questions within the first 2 minutes. Based on the second classifier, the real-time analysis component 130 can, at minute three of the conversation, urge the representative to reduce speech rate to get the customer to mirror their own speech rate if a competitor is mentioned or otherwise the phrase "read online" is used. If the speech rate is not reduced, the real-time analysis component 130 can indicate to the representative and/or their managers to wrap up the call as soon as possible.

The embodiments disclosed above may be implemented as separate modules, e.g., as presented above, as a single module, or any combination thereof. Implementation details may vary, including core machine learning algorithms employed. The embodiments may be implemented using any software development environment or computer language. The embodiments may be provided as a packaged software product, a web-service, an API or any other means of software service. The embodiments may use expert taggers, crowdsourcing or a hybrid approach for tagging.

Figure 7:
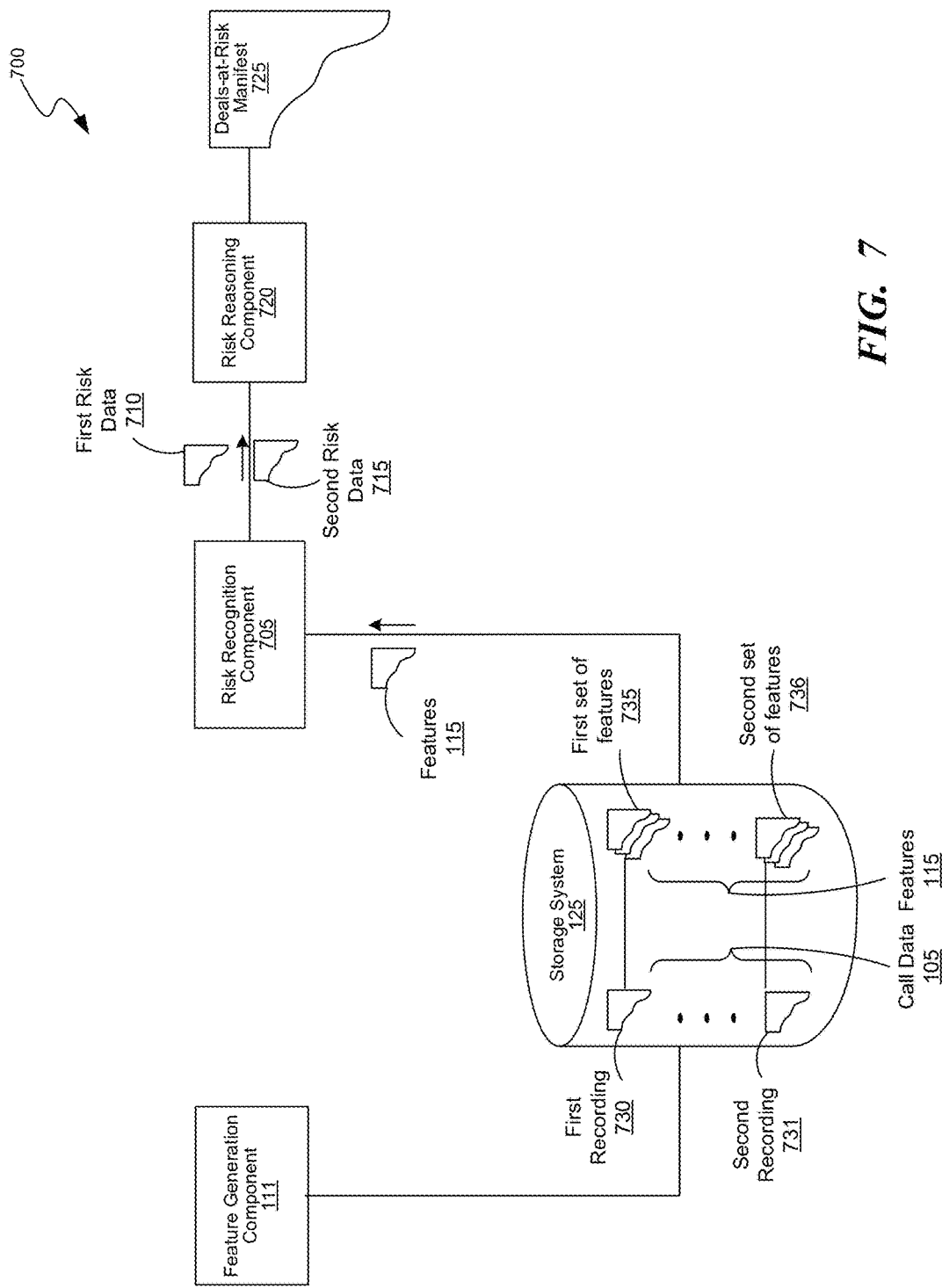
FIG. 7 is a block diagram of a risk identification system, consistent with various embodiments.

FIG. 7 is a block diagram of a risk identification system, consistent with various embodiments. The risk identification system 700 can analyze the call data 105 to determine deals of an organization that are at risk, and generate warnings or notifications of such deals, e.g., as deals-at-risk manifest 725. A consumer user can review the deals-at-risk manifest 725 and can initiate an appropriate action to help secure the deal for the organization. The risk identification system 700 includes a feature generation component, such as feature generation component 111 of FIG. 1, that generates features 115 of the conversations by analyzing the call data 105, e.g., a first recording 730 and a second recording 731, stored in the storage system 125. In some embodiments, the first recording 730 is of a conversation between a first representative and a first customer of the organization for discussing a first deal the organization is offering to the first customer. Similarly, the second recording 731 is of a conversation between a second representative and a second customer for discussing a second deal the organization is offering to the second customer. Note that the first representative can have multiple conversations with the first customer to discuss the first deal, and therefore, there can be multiple recordings corresponding to the first deal. Further, the first representative can have conversations with different customers to discuss different deals, and therefore, different recordings of the first representative can correspond to different deals. In some embodiments, a recording can be tagged with metadata, which can identify at least one of the representatives, the customer and the deal associated with the recording. Note that the recordings can be of a conversation that is any of telephone based, VoIP based, video conference based, VR based, AR based, e-mail based, or in-person interaction based.

The risk identification system 700 includes a risk recognition component 705 that analyzes the features 115 associated with the call data 105 to determine the deals that are at risk. For example, the risk recognition component 705 analyzes the first set of features 735 associated with the first recording 730 to determine if any feature from the first set of features 735 is indicative of the first deal being at risk. If the risk recognition component 705 determines that the first deal is at risk, the risk recognition component 705 generates first risk data 710 that includes one or more features from the first set of features 735 that satisfy a risk criterion for determining that the first deal is at risk. Similarly, the risk recognition component 705 analyzes the second set of features 736 associated with the second recording 731 to determine if any feature from the second set of features 736 is indicative of the second deal being at risk, and generate second risk data 715 that includes one or more features from the second set of features 736 that satisfy a risk criterion for determining that the second deal is at risk.

The risk identification system 700 includes a risk reasoning component 720 that analyzes the features in the first risk data 710 and the second risk data 715 to determine the reasons why the first and second deals are at risk. The risk reasoning component 720 can then generate the deals-at-risk manifest 725, which includes all deals that are determined to be at risk and a reason why each of those deals is at risk.

Referring back to the risk recognition component 705, the risk recognition component analyzes the features 115 associated with the call data 105 to determine the deals that are at risk. As described above at least with reference to FIG. 1, the feature generation component 111 can analyze the call data 105 to extract the features of the conversations. For example, the feature generation component 111 analyzes the first recording 730 to extract the first set of features 735 of a conversation of the first recording 730, and analyzes the second recording 731 to extract a second set of features 736 of a conversation of the second recording 731. In some embodiments, the first set of features 735 and the second set of features 736 are a subset of the features 115. The first set of features 735 can include transcripts of the conversations, vocabulary, semantic information of conversations, summarization of a call, summarizations of utterances and various natural language entailments, voice signal associated features (e.g., speech rate, speech volume, tone, and timber), detected emotions (e.g., fear, anger, happiness, timidity, fatigue, laughter), detected personality traits (e.g., trustworthiness, engagement, likeability, dominance, charisma, confidence, etc.), personal attributes (e.g., age, accent, and gender), and inter-speaker attributes that indicate a comparison between both the participants (e.g., similarity of speech rate between the representative and the customer, extrovert/introvert matching, or gender or age agreement). The first set of features 735 can include usage of words or phrases features such as specific word, phrase, and pronouns. The first set of features 735 can also include any of length of utterances and/or turns taken by a participant in talking during the conversation, talk-to-listen ratio of a representative or a customer, or any other behavioral feature of the customer. The first set of features 735 can be features associated with the first customer, the first representative, the conversation, or a combination.

Further, the first set of features 735 can include not only aural features, but also non-aural features, e.g., visual features such as body language of a participant, and facial expressions of the participant, or any combination of aural and non-aural features. Additionally, the first set of features 735 could include sales process indicators, e.g., indicators associated with sales activity of a customer such as decreased activity on a sales account associated with the customer, lack of updates to the account, or delayed follow-ups by the representatives with the customer. The first set of features 735 can also include information that indicates with which participant a particular feature is associated with. Further, one or more of the first set of features 735 could also be generated from the transcripts of any of emails, online messages, and online meetings. In some embodiments, the feature generation component 111 can determine that any of a word, a phrase, a text, emoji, symbols, or a combination thereof can convey a particular feature. For example, the feature generation component 111 can determine that a text such as "Ha Ha" or "rofl" in the transcript can indicate laughter. In some embodiments, the second set of features 736 includes features similar to that of the first set of features 735.

In analyzing the first set of features 735 to determine if the first deal is at risk, the risk recognition component 705 determines if any of the first set of features 735 satisfies the risk criterion. In some embodiments, the risk criterion can be specified by the consumer user and/or learnt by the risk recognition component 705, e.g., using AI and ML techniques, based on the deals categorized as at risk by the consumer user. Some examples of the risk criterion include any of losing a deal, reduction in budget of the deal, or deferral of a timeline for closing the deal. In some embodiments, the risk criterion can be any criterion that is specified by the consumer user. In some embodiments, the risk recognition component 705 can analyze those of the first set of features 735 that are based on the usage of words or phrases in the conversation corresponding to the first recording 730. For example, the risk recognition component 705 can identify words or phrases in the conversation such as "we don't have the budget for it," "this is not the right time for us," "could not review yet," "it is not a priority for us," "I do not have the authority to finalize," as features that satisfy the risk criterion. The risk recognition component 705 can use AI, ML, process-driven techniques (e.g., programmed by the consumer user) or a combination to identify the features (e.g., the above features, other such similar features or additional features) satisfying the risk criterion.

In some embodiments, the conversational indicators, e.g., the usage of words or phrases in the conversation, that indicate risk may not be as explicit as the above examples but implicit and subtle. The risk recognition component 705 can determine the risk based on such implicit indicators too. For example, the risk recognition component 705 can identify words or phrases used by the customer that are indicative of hesitation, which can include qualifying phrases such as "to be honest with you I don't know how," or "I'm not entirely sure what this would do for," as features that are indicative of the first deal being at risk.

The risk recognition component 705 is not restricted to the above conversational language-based features for determining if a deal is at risk. The risk recognition component 705 can use any feature associated with the conversation that can be indicative of the risk criterion being satisfied. In some embodiments, the risk recognition component 705 determines if the deal is at risk based on video features, such as facial expression or body language of the customer during the discussion of the deal; based on voice signal associated features (e.g., a speech rate, a speech volume, a tone, and a timber) of the customer, emotions of the customer (e.g., fear, anger, happiness, timidity, fatigue), personality traits of the customer (e.g., trustworthiness, engagement, likeability, dominance, etc.), or talk-listen ratio of the customer. For example, the risk recognition component 705 can analyze one or more of the above features, e.g., body language or if the customer responded to the representative only after the representative prompted the customer a number of times, and determine that the customer was not paying attention to the representative, and therefore, determine that the first deal is at risk. Upon determining that the first deal is at risk, the risk recognition component 705 can generate the first risk data 710 having one or more features that satisfy the risk criterion.

The risk reasoning component 720 analyzes the features in the first risk data 710 and determines the reason for the first deal to be at risk based on one or more of those features. For example, if the first risk data 710 includes a feature that indicates that the first deal is at risk because of the usage of the phrase "this is not the right time for us" by the customer, the risk reasoning component 720 can determine the reason as "timeline issues." In another example, if the first risk data 710 includes a feature that indicates that the first deal is at risk because of the usage of the phrases "could not review yet" and "low budget," then the risk reasoning component 720 can determine the reasons as "insufficient time for reviewing the deal" and "lack of budget." In yet another example, if the first risk data 710 includes a feature that indicates that the first deal is at risk because of a feature that indicates that customer did not pay attention to what the representative was talking during the conversation, then the risk reasoning component 720 can determine the reason as "customer not attentive during the conversation." In some embodiments, if the risk reasoning component 720 is not able to determine the exact reason of why the deal is at risk, the risk reasoning component 720 may indicate to schedule a follow up call with the customer. The consumer user may then schedule a follow-up call with the customer. For example, if the first risk data 710 includes a feature that indicates that the first deal is at risk because of usage of the phrase, such as "to be honest with you I don't know how," then the risk reasoning component 720 can determine the reason as "Customer not sure—Schedule follow up call to clarify."

The risk reasoning component 720 can use AI, ML, process-driven techniques (e.g., programmed by the consumer user) or a combination to determine the reasons, e.g., based on the features satisfying the risk criterion, why the deals are at risk. In some embodiments, a reason determined by the risk reasoning component 720 can be modified by the consumer user to a different reason, and the risk reasoning component 720 may learn from this change and determine the reason accordingly in subsequent analyses.

After the features in the first risk data 710 are analyzed and the reasons determined, the risk reasoning component 720 stores information regarding the first deal in the deals-at-risk manifest 725. The information in the deals-at-risk manifest can include any of deal ID of the deal that is at risk, recording ID of the recordings corresponding to the deal, and one or more reasons why the deal is at risk.

While the above paragraphs describe analysis of the first recording 730 to determine whether the first deal is at risk, the analysis is not restricted to the first recording 730. If the first representative had multiple conversations with the first customer regarding the first deal, the risk identification system 700 can analyze each of those multiple recordings corresponding to the first deal to determine whether the first deal is at risk. The first risk data 710 can include features of each of the recordings that satisfy the risk criterion. The first risk data 710 can also include metadata information such as a recording ID and deal ID to which each of the features in the first risk data 710 correspond. The criteria for determining if a deal is at risk when there are multiple recordings corresponding to the deal can be user-configured and/or determined automatically by the risk identification system 700. For example, the risk identification system 700 can determine that the first deal is at risk if an analysis of the latest recording corresponding to the first deal indicates that the first deal is at risk. In another example, the risk identification system 700 can determine that the first deal is at risk if an analysis of at least one of the recordings corresponding to the first deal indicates that the first deal is at risk. In another example, the risk identification system 700 can determine that the first deal is at risk if an analysis of a majority of the recordings corresponding to the first deal indicates that the first deal is at risk.

The risk recognition component 705 can similarly analyze various other recordings in the storage system 125 corresponding to various other deals, and generate risk data for each of the deals that are determined to be at risk. The risk recognition component 705 can generate separate risk data objects for each of the deals that are determined to be at risk, or generate a single risk data object that includes information regarding all the deals that are determined to be at risk. In the example of FIG. 7, the risk recognition component 705 generates separate risk data objects, e.g., first risk data 710 and second risk data 715, for the first deal and the second deal that are determined to be at risk.

The risk reasoning component 720 can analyze the features in the risk data object that are associated with various deals to determine the reasons why each of the deals is at risk, and generate the deals-at-risk manifest 725, which includes information regarding each of the deals that is at risk and the reason why each of the deals is at risk.

The risk reasoning component 720 can present the deals-at-risk manifest 725 is various ways. For example, the risk reasoning component 720 can generate the deals-at-risk manifest 725 as one or more graphs, e.g., as illustrated in FIG. 8 below.

Figure 8:
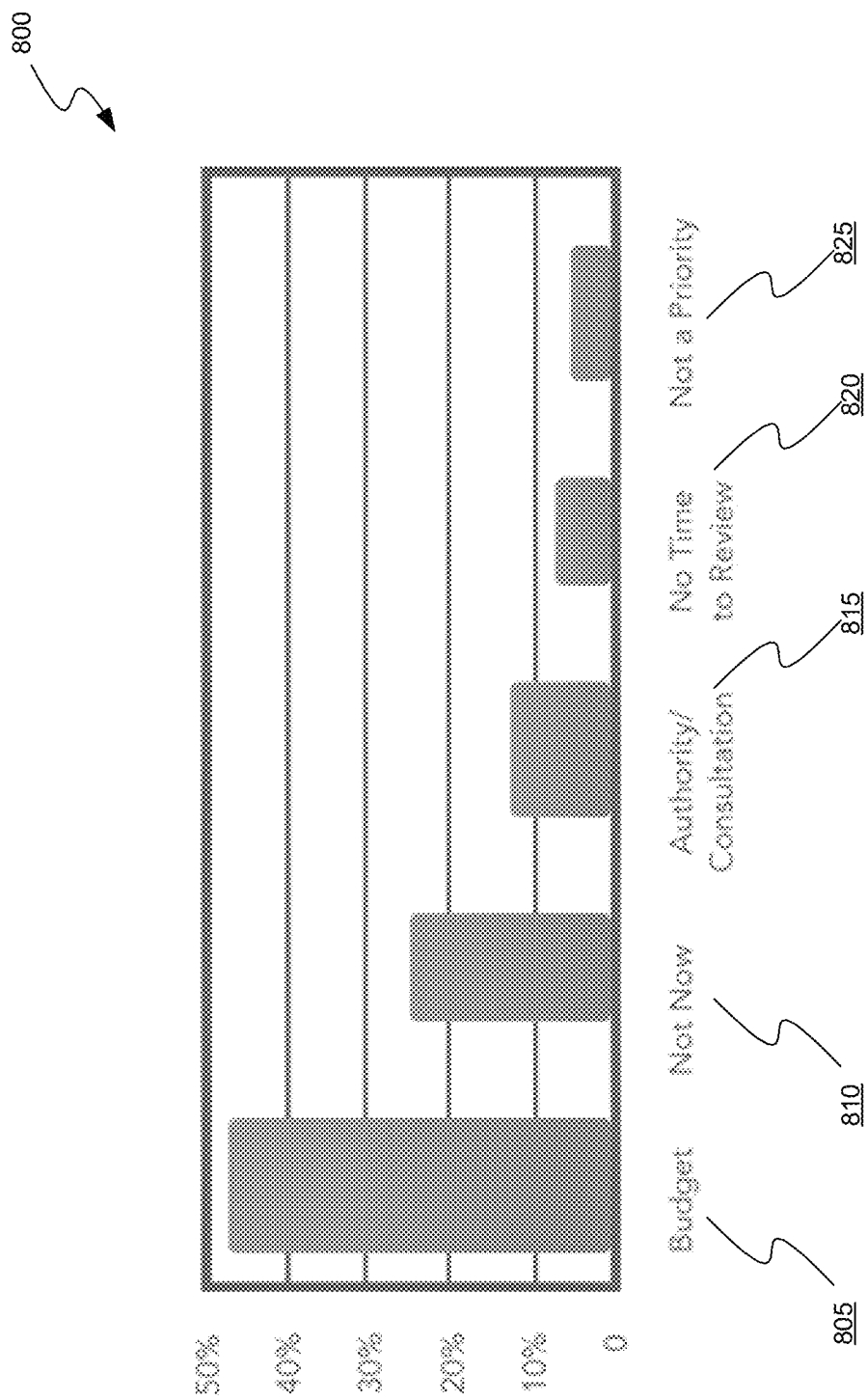
FIG. 8 is a graph depicting example reasons determined for why deals are at risk, consistent with various embodiments.

FIG. 8 is a graph 800 depicting example reasons determined for why deals are at risk, consistent with various embodiments. The graph 800 can be generated by the risk reasoning component 720 of FIG. 7. The graph 800 presents five example of reasons that are indicative of why deals are at risk. As described above, the risk reasoning component 720 can use AI, ML, process-driven techniques or a combination to identify the deals are at risk and why the deals are at risk.

The graph 800 presents example top 5 reasons determined by the risk identification system 700 for the deals being at risk. The first reason 805, "budget," which is indicative of the customer not having enough budget to close the deal, is determined to be approximately 50% of the reasons why the deals are determined to be at risk. One of the example features based on which the risk reasoning component 720 determines "budget" to be the reason is usage of a language by the customer such as "if I can get the sales ops team also interested, you know that would help me, um, help me significantly because I can also have an additional budget to tap."

The second reason 810, "timeline (aka "Not Now")," which is indicative of the time being appropriate for the customer for considering the deal, is determined to be approximately 25% of the reasons why the deals are determined to be at risk. One of the example features based on which the risk reasoning component 720 determines "timeline" to be the reason is usage of a language by the customer such as "not at this point I don't think I mean we've got some really established programs but I'll tell you if, you know, if there was need I would look into it, but at this stage, not at the moment no."

The third reason 815, "authority," which is indicative of the customer not having the authority to close or consider the deal, is determined to be approximately 15% of the reasons why the deals are determined to be at risk. One of the example features based on which the risk reasoning component 720 determines "authority" to be the reason is usage of a language by the customer such as "i don't have any decision making power when it comes to making contracts umm but I can talk to my engineering manager."

The fourth reason 820, "no time to review," which is indicative of the customer not having enough time to review the deal, is determined to be approximately 7% of the reasons why the deals are determined to be at risk. One of the example features based on which the risk reasoning component 720 determines "no time to review" to be the reason is usage of a language by the customer such as "honestly I thought I was going to have more time this weekend. I just had not given this nearly enough thought until now."

The fifth reason 825, "not a priority," which is indicative of the deal not being a priority to the customer, is determined to be approximately 3% of the reasons why the deals are determined to be at risk. One of the example features based on which the risk reasoning component 720 determines "not a priority" to be the reason is usage of a language by the customer such as "that would not jive with our current priorities right now."

The reasons illustrated in the graph 800 are just examples of some reasons for the deals at risk. The risk identification system 700 can determine many such reasons. Further, the risk identification system 700 can be configured to determine the reasons from a user-defined set of reasons, or learn the reasons, e.g., using AI or ML techniques.

Figure 9:
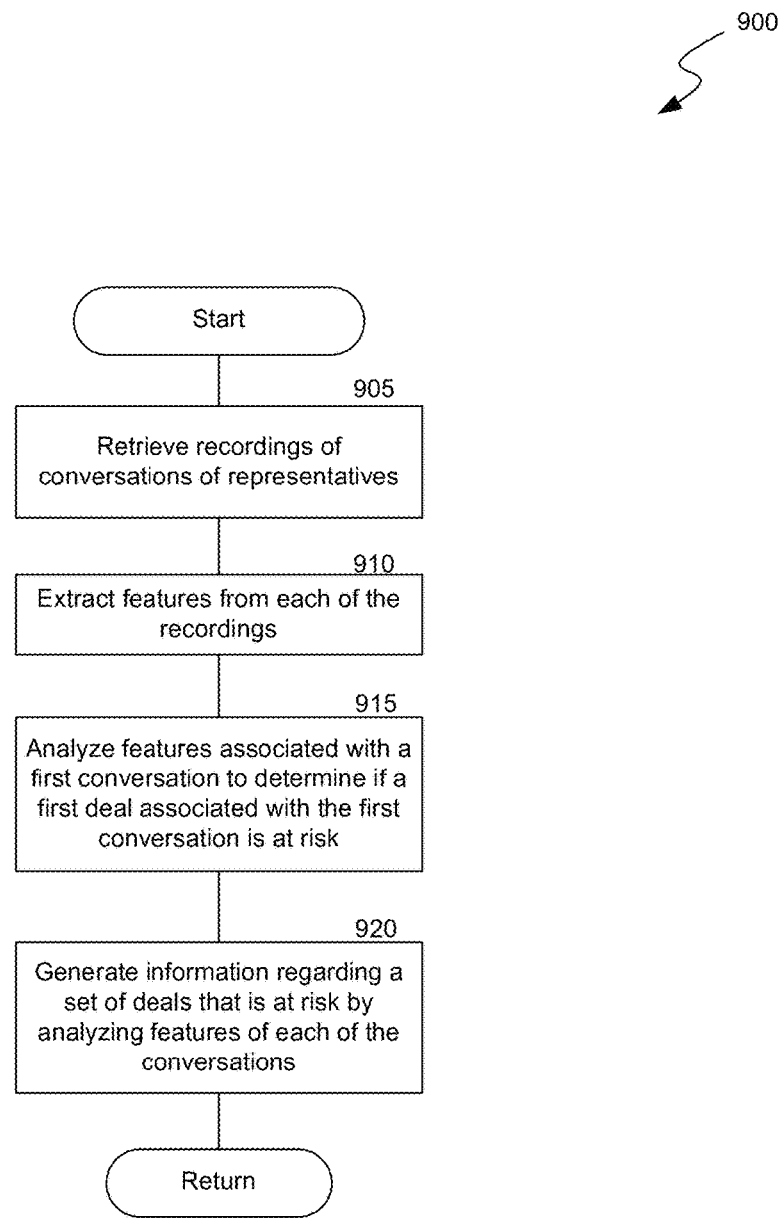
FIG. 9 is a flow diagram of a process for determining the deals at risk, consistent with various embodiments.

FIG. 9 is a flow diagram of a process 900 for determining the deals at risk, consistent with various embodiments. In some embodiments, the process 900 can be implemented using the risk identification system 700 of FIG. 7. At block 905, the feature generation component 110 retrieves recordings of conversations of representatives, e.g., a first recording 730 and a second recording 731. Each of the recordings is of a conversation between at least one of the representatives and one of the customers and is about a deal being offered to the customer.

At block 910, the feature generation component 111 extracts features from the recordings, e.g., the first set of features 735 corresponding to the first recording 730 and second set of features 736 corresponding to the second recording. The first set of features 735 can indicate characteristics of any of (a) a first customer in a corresponding conversation, (b) a first representative in the corresponding conversation, and/or (c) the corresponding conversation. Similarly, the second set of features 736 can indicate characteristics of any of (a) a second customer in a corresponding conversation, (b) a second representative in the corresponding conversation, or (c) the corresponding conversation. In some embodiments, the feature generation component 111 can also include sales process indicators in the first set of features 735, e.g., indicators associated with sales activity of a customer such as decreased activity on a sales account associated with the customer, lack of updates to the account, or delayed follow-ups by the representatives with the customer.

At block 915, the risk recognition component 705 analyzes the features of each of the conversations to determine if a deal discussed in the corresponding conversation is at risk, e.g., as described at least with reference to FIG. 7. The risk recognition component 705 can determine a deal to be at risk if the conversation to which the deal corresponds has features that satisfy a risk criterion. For example, the risk recognition component 705 can determine the first deal to be at risk if the first set of features 735 includes one or more features that satisfy a risk criterion. The risk recognition component 705 generates risk data, which includes one or more features of each of the deals that satisfy the risk criterion. Additional details with respect to generating risk data is described at least with reference to FIG. 7.

At block 920, the risk reasoning component 720 generates information regarding a set of deals that are determined to be at risk, e.g., as a deals-at-risk manifest 725 as described at least with reference to FIG. 7. The deals-at-risk manifest 725 includes information regarding deals that are determined to be at risk such as deal IDs of the deals and one or more reasons why each of the deals is determined to be at risk. In some embodiments, the risk reasoning component 720 determines the one or more reasons a deal is at risk by analyzing the features of the deal in the risk data object, e.g., features of one or more conversations to which the deal corresponds and that satisfy a risk criterion.

While the foregoing paragraphs are described with reference to identifying deals at risk, the disclosed embodiments are not restricted to identifying deals at risk; the disclosed embodiments can be used to identify deals that match any user-defined criterion. For example, the disclosed embodiments can be used to identify deals that are categorized as "high priority." A consumer user can define the criterion for considering a deal as "high priority." For example, the risk criterion can be modified to "high priority" criterion and the risk identification system 700 can be configured to determine deals that are of "high priority" accordingly. That is, the risk identification system 700 can determine if a conversation has features that satisfy the "high priority" criterion and if yes, determine a deal corresponding to the conversation as "high priority."

Further, the risk identification system 700 can be used to analyze recordings of calls (e.g., offline mode) as described above, and/or can be used to analyze a real-time call or an ongoing call (e.g., online mode) between a representative and the customer and notify the representative, e.g., on a screen of a computing device associated with the representative or any other consumer user, if a deal that is being discussed in the ongoing call is determined to be at risk. The risk identification system 700 can perform a similar analysis with the ongoing call as with the recordings of the call.

Figure 10:
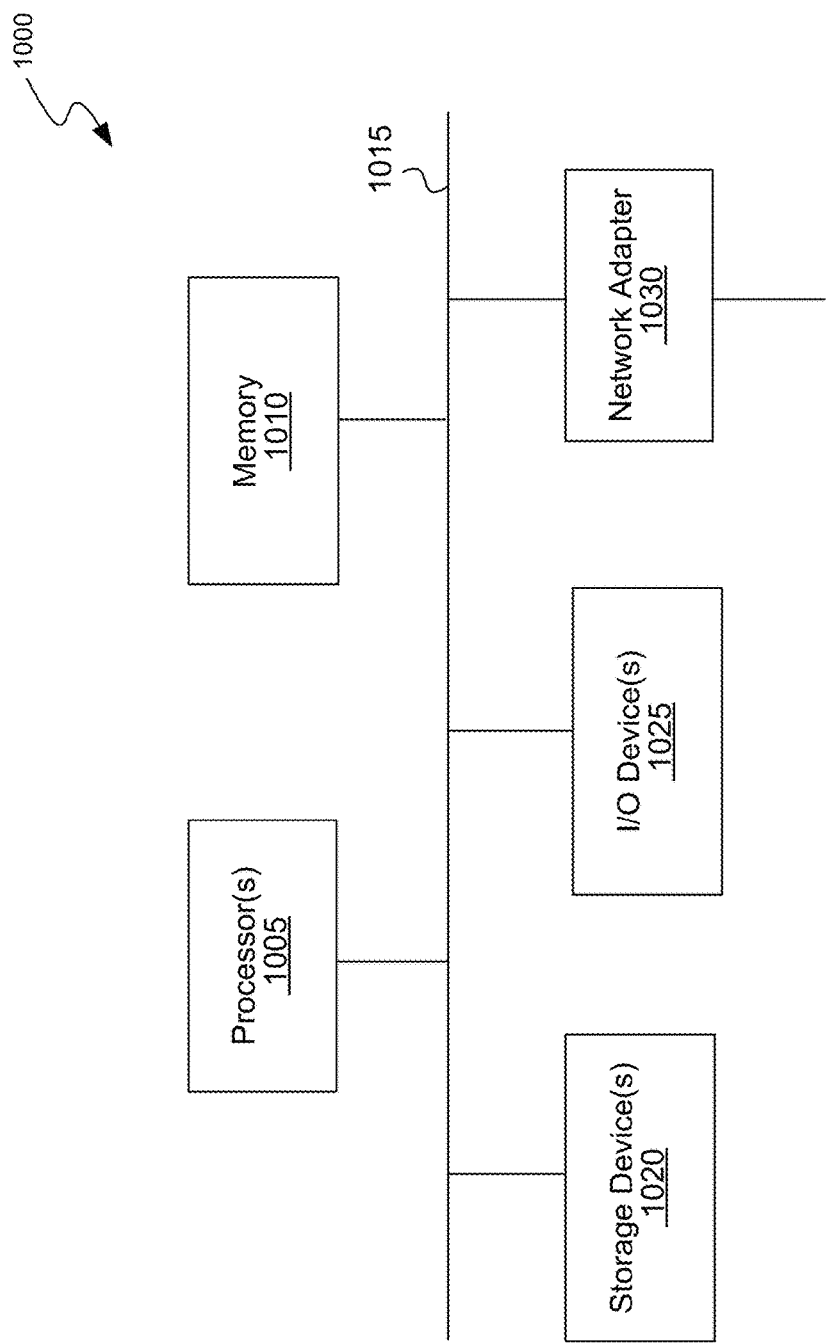
FIG. 10 is a block diagram of a processing system that can implement operations of the disclosed embodiments.

FIG. 10 is a block diagram of a computer system as may be used to implement features of the disclosed embodiments. The computing system 1000 may be used to implement any of the entities, components or services depicted in the examples of the foregoing figures (and any other components described in this specification). The computing system 1000 may include one or more central processing units ("processors") 1005, memory 1010, input/output devices 1025 (e.g., keyboard and pointing devices, display devices), storage devices 1020 (e.g., disk drives), and network adapters 1030 (e.g., network interfaces) that are connected to an interconnect 1015. The interconnect 1015 is illustrated as an abstraction that represents any one or more separate physical buses, point to point connections, or both connected by appropriate bridges, adapters, or controllers. The interconnect 1015, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1010 and storage devices 1020 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 1010 can be implemented as software and/or firmware to program the processor(s) 1005 to carry out actions described above. In some embodiments, such software or firmware may be initially provided to the processing system 1000 by downloading it from a remote system through the computing system 1000 (e.g., via network adapter 1030).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method, comprising:
retrieving multiple recordings of conversations associated with multiple representatives, wherein each of the conversations is between at least one of the representatives and at least one of multiple customers, and wherein each conversation is associated with a deal offered by the at least one of the representatives to the at least one of the customers;
extracting multiple features from each of the multiple recordings, wherein the multiple features indicate characteristics of any of (a) a customer of multiple customers in the corresponding conversation, (b) a representative of multiple representatives in the corresponding conversation, (c) the corresponding conversation;
analyzing features associated with a first conversation of the conversations to determine if the first conversation includes any feature that is indicative of a first deal associated with the first conversation being at a risk, wherein the analyzing is performed for each of the conversations; and
generating, based on the analyzing, information regarding a set of deals that is at risk, wherein each deal of the set of deals is determined to be at risk in an event one or more conversations with which the corresponding deal is associated includes features that are indicative of the corresponding deal being at risk, the generating further including generating a reason why each deal of the set of deals is at risk.

2. The computer-implemented method of claim 1, wherein
analyzing the features to determine if the first deal is at risk includes:
determining that the first conversation includes a set of features that satisfies a risk criterion.

3. The computer-implemented method of claim 2, wherein the set of features satisfies the risk criterion in an event the set of features is indicative of the first deal being lost.

4. The computer-implemented method of claim 2, wherein the set of features satisfies the risk criterion in an event the set of features is indicative of a reduction in budget associated with the first deal.

5. The computer-implemented method of claim 2, wherein the set of features satisfies the risk criterion in an event the set of features is indicative of a delay in closing of the first deal.

6. The computer-implemented method of claim 2, wherein the set of features satisfies the risk criterion in an event the set of features is indicative of the first deal being not a priority to a customer associated with the first conversation.

7. The computer-implemented method of claim 1, wherein analyzing the features to determine if the first deal is at risk includes determining, based on a usage of a specified word or a phrase by a customer associated with the first conversation, a set of features that is indicative of the first deal being at risk.

8. The computer-implemented method of claim 7, wherein determining the set of features includes determining a first feature from the set of features that is indicative of the customer citing lack of budget for closing the first deal.

9. The computer-implemented method of claim 7, wherein determining the set of features includes determining a first feature from the set of features that is indicative of the customer citing lack of authority for closing the first deal.

10. The computer-implemented method of claim 7, wherein determining the set of features includes determining a first feature from the set of features that is indicative of the customer citing lack of time to review the first deal.

11. The computer-implemented method of claim 7, wherein determining the set of features includes determining a first feature from the set of features that is indicative of the customer citing the first deal as not a priority to the customer.

12. The computer-implemented method of claim 7, wherein determining the set of features includes determining a first feature from the set of features that is indicative of the customer citing timeline of closing the first deal as a problem.

13. The computer-implemented method of claim 7, wherein generating the information regarding the set of deals includes generating the reason based on the set of features using which the first deal is determined to be at risk.

14. The computer-implemented method of claim 13, wherein generating the reason based on the set of features includes generating the reason as at least one of lack of budget for closing the first deal, lack of authority for closing the first deal, lack of time to review the first deal, the first deal not being a priority to the customer, or a timeline for closing the first deal.

15. The computer-implemented method of claim 1, wherein extracting the features includes:
generating features that include a transcription, vocabulary and a language model of the conversations as a first output.

16. The computer-implemented method of claim 15, wherein extracting the features includes:
generating, using the first output, features that include semantic information from the conversations.

17. The computer-implemented method of claim 1, wherein extracting the features includes:
generating a set of low-level features that indicate information associated with a voice signal in the multiple recordings, and a set of high-level features that include personality traits and personal attributes of the multiple representatives and emotion data that indicates emotions of the multiple representatives.

18. The computer-implemented method of claim 1, wherein extracting the features includes generating features that include data regarding conversation flow.

19. The computer-implemented method of claim 1, wherein extracting the features includes generating features related to a representative-customer pair in a conversation of the conversations.

20. The computer-implemented method of claim 1, wherein extracting the features includes:
generating a speaker engagement metric that includes information regarding a degree of engagement of a specified customer of the multiple customers in a conversation of the conversations.

21. The computer-implemented method of claim 1, wherein extracting the first set of features includes extracting a visual feature associated with a conversation of the conversations.

22. The computer-implemented method of claim 1, wherein extracting the features includes extracting the features using any of an artificial intelligence, a machine learning, or natural language processing technique.

23. The computer-implemented method of claim 1, wherein analyzing the features of each of the conversations includes analyzing the features using any of an artificial intelligence, a machine learning, or natural language processing technique.

24. The computer-implemented method of claim 1, wherein at least one of the multiple recordings includes a recording of a video call between one of the customers and one of the representatives.

25. The computer-implemented method of claim 1, wherein at least one of the multiple recordings includes an online meeting between one of the customers and one of the representatives.

26. The computer-implemented method of claim 1, wherein at least one of the multiple recordings includes a recording of a virtual reality-based conversation between one of the customers and one of the representatives.

27. The computer-implemented method of claim 1, wherein at least one of the multiple recordings includes a recording of an augmented reality-based conversation between one of the customers and one of the representatives.

28. The computer-implemented method of claim 1, wherein at least one of the multiple recordings includes an e-mail conversation between one of the customers and one of the multiple representatives.

29. A non-transitory computer-readable storage medium storing computer-readable instructions, comprising:
  instructions for retrieving multiple recordings of conversations associated with multiple representatives, wherein each conversation includes at least one of multiple customers and at least one of the representatives, and wherein each conversation is associated with a deal offered by the at least one of the representatives to the at least one of the customers;
  instructions for extracting multiple features from each of the multiple recordings, wherein the multiple features indicate characteristics of any of (a) a customer of multiple customers in the corresponding conversation, (b) a representative of multiple representatives in the corresponding conversation, (c) the corresponding conversation;
  instructions for analyzing the features of each of the conversations to determine if a first conversation of the conversations includes any feature that is indicative of a first deal associated with the first conversation being at a risk; and
  instructions for generating, based on the analyzing, information regarding a set of deals that is at risk, wherein each deal of the set of deals is determined to be at risk in an event one or more conversations with which the corresponding deal is associated includes features that are indicative of the corresponding deal being at risk, the generating further including generating a reason why each deal of the set of deals is at risk.

30. The non-transitory computer-readable storage medium of claim 29, wherein the instructions for analyzing the features to determine if the first deal is at risk includes instructions for determining, based on a usage of a specified word or a phrase by a customer associated with the first conversation, a set of features that is indicative of the first deal being at risk.

31. The non-transitory computer-readable storage medium of claim 30, wherein the instructions for generating the reason based on the set of features include:
  instructions for generating the reason as at least one of lack of budget for closing the first deal, lack of authority for closing the first deal, lack of time to review the first deal, the first deal not being a priority to the customer, or a timeline for closing the first deal.

32. A system, comprising:
  a first component that is configured to extract multiple features from each of multiple recordings of conversations, wherein each conversation includes at least one of multiple customers and at least one of the representatives, and wherein each conversation is associated with a deal offered by the at least one of the representatives to the at least one of the customers;
  a second component that is configured to analyze the features of each of the conversations to determine if a first conversation of the conversations includes any feature that is indicative of a first deal associated with the first conversation being at a risk; and
  a third component that is configured to generate information regarding a set of deals that is at risk, wherein each deal of the set of deals is determined to be at risk in an event one or more conversations with which the corresponding deal is associated includes features that are indicative of the corresponding deal being at risk, the generating further including generating a reason why each deal of the set of deals is at risk.

* * * * *